United States Patent
Ren et al.

(10) Patent No.: US 11,860,304 B2
(45) Date of Patent: Jan. 2, 2024

(54) METHOD AND SYSTEM FOR REAL-TIME LANDMARK EXTRACTION FROM A SPARSE THREE-DIMENSIONAL POINT CLOUD

(71) Applicants: Yuan Ren, Vaughan (CA); Bingbing Liu, Markham (CA); Ran Cheng, Markham (CA)

(72) Inventors: Yuan Ren, Vaughan (CA); Bingbing Liu, Markham (CA); Ran Cheng, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 569 days.

(21) Appl. No.: 17/061,367

(22) Filed: Oct. 1, 2020

(65) Prior Publication Data

US 2022/0107391 A1    Apr. 7, 2022

(51) Int. Cl.
*G01S 7/48* (2006.01)
*G06T 7/521* (2017.01)
(Continued)

(52) U.S. Cl.
CPC ............ *G01S 7/4802* (2013.01); *G01S 17/42* (2013.01); *G01S 17/931* (2020.01); *G06F 18/232* (2023.01); *G06F 18/251* (2023.01); *G06T 7/521* (2017.01); *G06T 7/73* (2017.01); *G06V 20/56* (2022.01); *G06T 2207/10028* (2013.01)

(58) Field of Classification Search
None
See application file for complete search history.

(56) References Cited

U.S. PATENT DOCUMENTS

| | | |
|---|---|---|
| 10,650,278 B1 | 5/2020 | Ho et al. |
| 2016/0035081 A1 | 2/2016 | Stout et al. |

(Continued)

FOREIGN PATENT DOCUMENTS

| | | |
|---|---|---|
| CN | 110782531 A | 2/2020 |
| WO | 2010042466 A1 | 4/2010 |

OTHER PUBLICATIONS

Yang, Bisheng, et al. "Automatic registration of large-scale urban scene point clouds based on semantic feature points." ISPRS Journal of Photogrammetry and Remote Sensing 113 (2016): 43-58. (Year: 2016).*

(Continued)

*Primary Examiner* — Luke D Ratcliffe

(57) ABSTRACT

A system and method for processing a 3D point cloud to generate a segmented point cloud in real time are disclosed, the method includes: receiving a sparse 3D point cloud captured by a detection and ranging sensor mounted to a vehicle, the 3D point cloud comprising a plurality of data points, each data point in the 3D point cloud having a set of coordinates in a coordinate system of the detection and ranging sensor; generating, from the 3D point cloud, a range map comprising a plurality of elements, each of the plurality of data points of the 3D point cloud occupying a respective element of the plurality of elements; labelling the data point in each respective element of the range map as one of a pole-like data point or a vertical-plane-like data point; and generating the segmented point cloud including one or more of the labeled data points.

15 Claims, 16 Drawing Sheets

(51) Int. Cl.
  *G06T 7/73* (2017.01)
  *G01S 17/42* (2006.01)
  *G01S 17/931* (2020.01)
  *G06V 20/56* (2022.01)
  *G06F 18/232* (2023.01)
  *G06F 18/25* (2023.01)

(56) References Cited

U.S. PATENT DOCUMENTS

2018/0275277 A1   9/2018  Li et al.
2020/0098135 A1*  3/2020  Ganjineh ............... G06T 7/74

OTHER PUBLICATIONS

Morales, Jesús, et al. "Analysis of 3D scan measurement distribution with application to a multi-beam lidar on a rotating platform." Sensors 18.2 (2018): 395. (Year: 2018).*

E. Grilli et al. "A Review of Point Clouds Segmentation and Classification Algorithms" ISPRS—International Archives of the Photogrammetry, Remote Sensing and Spatial Information Sciences. XLII-2/W3. 339-344 Mar. 2017.

Vo, A. V., et al. "Octree-based region growing for point cloud segmentation" ISPRS Journal of Photogrammetry and Remote Sensing, vol. 104, pp. 88-100 2015.

X. Ning et al. "Primitive Shape Extraction for Objects in Point Cloud," 2017 International Conference on Virtual Reality and Visualization (ICVRV), Zhengzhou, China, pp. 144-149. 2017.

S. Xu et al. "Road Curb Extraction From Mobile LiDAR Point Clouds", in IEEE Transactions on Geoscience and Remote Sensing, vol. 55, No. 2, pp. 996-1009 Feb. 2017.

Y. Li et al. "Localization and Extraction of Road Poles in Urban Areas from Mobile Laser Scanning Data". Remote Sens. 2019, 11, 401 2019.

A. Schaefer, et al. "Long-Term Urban Vehicle Localization Using Pole Landmarks Extracted from 3-D Lidar Scans". 1-7. 10.1109/ECMR.2019.8870928 2019.

A. Milioto et al. "RangeNet++: Fast and Accurate LiDAR Semantic Segmentation", IEEE/RSJ Intl.~Conf.~on Intelligent Robots and Systems (IROS) 2019.

J. Behley et al. "SemanticKITTI: A Dataset for Semantic Scene Understanding of LiDAR Sequences", Proc. of the IEEE/CVF International Conf.~on Computer Vision (ICCV) 2019.

* cited by examiner

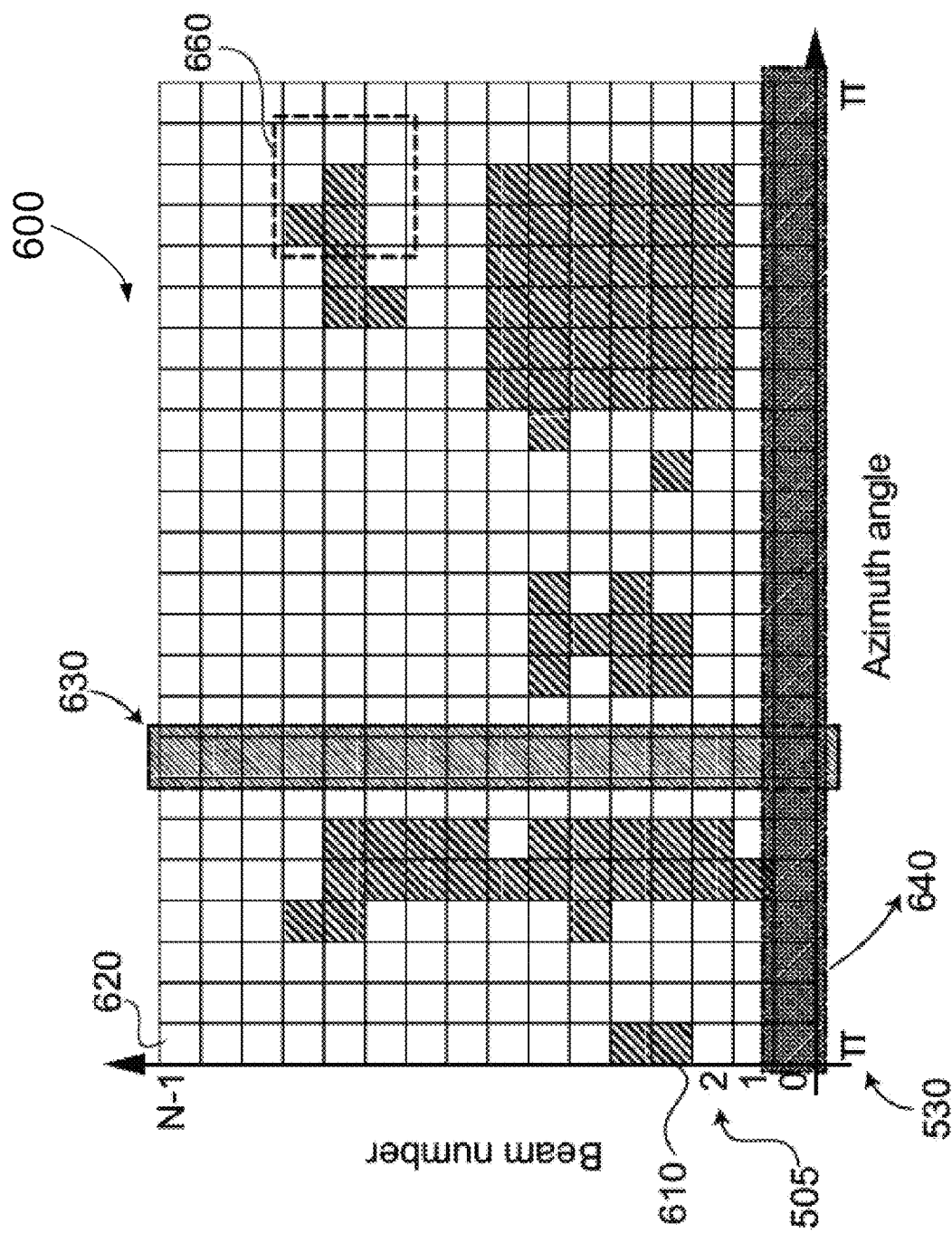

METHOD AND SYSTEM FOR REAL-TIME LANDMARK EXTRACTION FROM A SPARSE THREE-DIMENSIONAL POINT CLOUD

FIELD

The present disclosure relates to methods and systems for extracting landmarks from a sparse three-dimensional point cloud and generating a segmented three-dimensional (3D) point cloud in real time or near real time for use in localization and mapping in autonomous vehicles.

BACKGROUND

An autonomous vehicle includes different types of sensors (e.g. cameras, such as optical cameras, and detection and ranging sensors, such a light detection and ranging (LIDAR) sensors) which sense an environment surrounding the autonomous vehicle (i.e. the environment around the autonomous vehicle in which the autonomous vehicle is operating in). The autonomous vehicle includes a computing system that processes the sensor data received from the different types of sensors (e.g. image data from the camera, a three-dimensional point cloud from the detection and ranging sensor) to perform object detection, or semantic segmentation to detect and classify objects of interest (e.g., pedestrians, buildings, poles, or other cars) in image data or the three-dimensional point cloud.

One type of sensor generally mounted on an autonomous vehicle to sense the surrounding environment of the autonomous vehicle is a LIDAR sensor. A LIDAR sensor spins 360 degrees around a base to generate an observation (i.e. LIDAR frame) of a surrounding environment of the autonomous vehicle and generates a 3D point cloud based on the observation. The 3D point cloud can then be used for localization of the autonomous vehicle (i.e. to estimate a current position of the vehicle), among other purposes. In reality, the environment surrounding the autonomous vehicle is constantly changing. For example, tree leaves change with time. If time-varying objects are used for localization of the autonomous vehicle without being processed, the accuracy of a current position of the vehicle cannot be guaranteed. Hence, it is important to use static objects, such as landmarks, for localization of an autonomous vehicle. In an urban environment, a lot of static landmarks are pole-like objects and vertical planes.

Most existing methods for extracting landmarks from a 3D point cloud are performed on dense 3D point clouds (i.e. 3D point clouds that includes several that are usually obtained by a survey LIDAR), and rely on offline processing algorithms, such as Morphological analysis and deep learning methods. A dense 3D point cloud is typically generated by a survey LIDAR sensor, which generally has just one laser beam that scans in a very high speed (e.g., 200~250 revolutions per second). The methods for extracting landmarks from dense 3D point clouds tend to be computationally intensive, and hence are unsuitable for use on autonomous vehicles because autonomous vehicles generally have limited computing and memory resources for executing these deep learning methods. In addition, the LIDAR sensors used by autonomous vehicles generally generate and output sparse 3D point clouds, which are not as dense as the type of point clouds generated by survey LIDAR sensors.

Improvements in extracting landmarks from 3D point clouds are therefore desirable.

SUMMARY

The present disclosure describes example embodiments implemented onboard autonomous vehicles to detect and extract landmarks, such as poles and vertical planes, from sparse 3D point clouds in real time and generate a segmented 3D point cloud map for use in localization and mapping of the autonomous vehicle. By exploiting distinct characteristics of commonly found pole-like or vertical-plane-like objects and using a range map generated from the sparse 3D point cloud, the described methods and systems can determine regions of data points in the sparse 3D point cloud likely belonging to a pole or vertical plane and generate a segmented 3D point cloud, without needing to perform computations to label every single data point in the sparse 3D point cloud, thereby achieving improved computational efficiency.

In one aspect, the present disclosure provides a computer-implemented method for processing a 3D point cloud to extract landmarks in real time are disclosed, the method includes: receiving a sparse 3D point cloud captured by a detection and ranging sensor mounted to a vehicle, the sparse 3D point cloud comprising a plurality of data points, each data point in the sparse 3D point cloud having a set of coordinates in a coordinate system of the detection and ranging sensor; generating, from the sparse 3D point cloud, a range map comprising a plurality of elements, each of the plurality of data points of the sparse 3D point cloud occupying a respective element of the plurality of elements; labelling the data point in each respective element of the range map as one of a pole-like data point or a vertical-plane-like data point; and generating the segmented point cloud including one or more of the labeled pole-like data points and one or more of the labelled vertical-plane-like data points.

In another aspect, the present disclosure provides a vehicle control system of an autonomous vehicle for processing a sparse 3D point cloud to a segmented point cloud in real time, the vehicle control system including: a processor; and a memory coupled to the processor, the memory storing machine-executable instructions that, when executed by the processor, cause the vehicle control system to: receive a sparse 3D point cloud captured by a detection and ranging sensor mounted to a vehicle, the sparse 3D point cloud having a plurality of data points, each data point in the sparse 3D point cloud having a set of coordinates in a coordinate system of the detection and ranging sensor; generate, from the sparse 3D point cloud, a range map comprising a plurality of elements, each of the plurality of data points of the sparse 3D point cloud occupying a respective element of the plurality of elements; label the data point in each respective element of the range map as one of a pole-like data point or a vertical-plane-like data point; and generate the segmented point cloud including one or more of the labeled pole-like data points and one or more of the labelled vertical-plane-like data points.

In yet another aspect, the present disclosure provides a non-transitory computer-readable medium storing machine-executable instructions which, when executed by a processor of a vehicle control system of an autonomous vehicle causes the vehicle control system to: receive a sparse 3D point cloud captured by a detection and ranging sensor mounted to a vehicle, the sparse 3D point cloud comprising a plurality of data points, each data point in the sparse 3D point cloud having a set of coordinates in a coordinate system of the detection and ranging sensor; generate, from the sparse 3D point cloud, a range map comprising a plurality of elements, each of the plurality of data points of the sparse 3D point cloud occupying a respective element of the plurality of elements; label the data point in each respective element of the range map as one of a pole-like data point or a vertical-plane-like data point; and generate the segmented point cloud including one or more of the labeled pole-like data points and one or more of the labelled vertical-plane-like data points.

The disclosed embodiments provide a number of improvements over the traditional point cloud segmentation methods, which tend to use an occupancy grid map for extracting landmarks. For example, by converting the sparse 3D point cloud first to a (2D) range map prior to generating region clusters, the embodiments herein can reduce distortion and avoid complex processing of the entire 3D point cloud. The range map is generated based on characteristics of the LIDAR sensor of a vehicle, and in particular, using the concept of beam numbers assigned to each laser head of the LIDAR sensor, and Azimuth angles associated with each sector of the LIDAR sensor.

In addition, an occupancy grid map is not very effective for detecting a ceiling. In contrast, the methods described herein can classify data points in the sparse 3D point cloud as both ground data points and ceiling data points effectively by using the range map and computing an inclination value between data points in the 3D point cloud that are in adjacent elements of the range map. Furthermore, as each element of the range map contains at most one data point from the 3D point cloud, using the range map to generate region clusters encounters less distortion than using an occupancy grid map.

In some embodiments, the detection and ranging sensor is a multi-laser spinning LIDAR sensor.

In some embodiments, the method may include, or the instructions, when executed by the processor, may cause the system to perform: determining a plurality of seed data points from the plurality of data points of the sparse 3D point cloud, the plurality of the seed data points including the labeled pole-like data points and the labelled vertical-plane-like data points; generating one or more region clusters based on the plurality of seed data points; determining and storing a list of pole clusters or a list of vertical plane clusters from the one or more region clusters, the list of pole clusters including one or more of the labeled pole-like data points and the list of vertical plane clusters including one or more of the labelled vertical-plane-like data points; and generating the segmented point cloud based on the list of pole clusters or the list of vertical plane clusters.

In some embodiments, each of the plurality of data points of the sparse 3D point cloud is associated with a beam number from a plurality of beam numbers, and each beam number from the plurality of beam numbers corresponds to a respective laser head of the multi-laser spinning LIDAR sensor of the vehicle.

In some embodiments, when the detection and ranging sensor is a multi-laser spinning light detection and ranging (LIDAR) sensor, each of the plurality of data points of the sparse 3D point cloud may be associated with a beam number from a plurality of beam numbers of the multi-laser spinning LIDAR sensor, and each respective beam number from the plurality of beam numbers corresponds to a respective laser head of the multi-laser spinning LIDAR sensor.

In some embodiments, the method include, or the instructions, when executed by the processor, may cause the system to perform: for each beam number from the plurality of beam numbers: determining an Azimuth angle for each data point in the plurality of data points that is associated with the beam number; and for each data point from the plurality of data points associated with the beam number, marking a respective element of the range map occupied by the respective data point based on the Azimuth angle and the associated beam number of the respective data point.

In some embodiments, the sparse 3D point cloud may be represented in a Cartesian coordinate system, and for any data point Pi in the plurality of data points having a set of coordinate values $[x_i, y_i, z_i]$, the Azimuth angle of the data point Pi is represented by $\alpha_i$ and computed by:

$$\alpha_i = \operatorname{atan}\left(\frac{y_i}{x_i}\right).$$

In some embodiments, the sparse 3D point cloud may be represented in a spherical coordinate system of the LIDAR unit, each data point Pi in the plurality of data points has a set of coordinate values $[r_i, \omega_i, \alpha_i]$, where:

$r_i$ represents a radial distance between an origin of the spherical coordinate system and the data point $P_i$;

$\omega_i$ represents an elevation angle of the data point $P_i$;

$\alpha_i$ represents the Azimuth angle of the data point $P_i$; and $P_i$ has a corresponding set of Cartesian coordinate values $[x_i, y_i, z_i]$ determined based on:

$x_i = r_i \cos \omega_i \cos \alpha_i$, $y_i = r_i \cos \omega_i \sin \alpha_i$, and $z_i = r_i \sin \omega_i$.

In some embodiments, the method further include, or the instructions, when executed by the processor, may cause the system to perform: computing and storing a curvature value for each of the plurality of data points of the sparse 3D point cloud.

In some embodiments, for any data point $P_i$ occupying a respective element of the range map and having a set of coordinate values $[x_i, y_i, z_i]$, the curvature value of the data point $P_i$ is represented by c and computed by:

$$c = \frac{\sqrt{\left(2kx_i - \sum_{j=i-k, j\neq i}^{i+k} x_j\right)^2 + \left(2ky_i - \sum_{j=i-k, j\neq i}^{i+k} y_j\right)^2 + \left(2kz_i - \sum_{j=i-k, j\neq i}^{i+k} z_j\right)^2}}{x_i^2 + y_i^2 + z_i^2},$$

where $[x_j, y_j, z_j]$ represents a set of Cartesian coordinate values of each adjacent data point $P_j$ in a plurality of adjacent data points in the sparse 3D point cloud, wherein the plurality of adjacent data points are generated by one or more laser beams emitted by the same laser head of the multi-laser spinning LIDAR sensor that has emitted the laser beam that generated $P_i$, and k is a total number of adjacent data points $P_j$, $j=\{1, 2 \ldots k\}$ on each side of data point $P_i$ in a row of elements in the range map.

In some embodiments, k has a value ranging from 2 to 5.

In some embodiments, determining the plurality of seed data points may include: for any two adjacent data points $P_i$ and $P_{i+1}$ in the sparse 3D point cloud as measured by any two adjacent laser beams of the multi-laser spinning LIDAR sensor, wherein $P_i$ and $P_{i+1}$ each occupies a respective element in two adjacent elements in a column of the range map, and wherein $P_i$ has a set of coordinate values $[x_i, y_i, z_i]$ and $P_{i+1}$ has a set of coordinate values $[x_{i+1}, y_{i+1}, z_{i+1}]$ in a Cartesian coordinate system of the multi-laser spinning LIDAR sensor:

computing an inclination value represented by $\vartheta$ between the two adjacent data points in accordance with the formula $$\vartheta = \operatorname{atan}\left(\frac{z_{i+1} - z_i}{\sqrt{x_{i+1}^2 + y_{i+1}^2} - \sqrt{x_i^2 + y_i^2}}\right);$$

when the value of $\vartheta$ is within a pre-defined inclination threshold, the two adjacent data points $P_i$ and $P_{i+1}$ are determined to be seed data points.

In some embodiments, the pre-defined inclination threshold is within a range of 70 to 110 degrees, for example, at 90 degrees.

In some embodiments, generating one or more region clusters may include, for each seed data point, represented by $P_s$ and having a set of Cartesian coordinate values $[x_s, y_s, z_s]$ from the plurality of seed data points, when $P_s$ is not yet in any region cluster: adding the seed data point $P_s$ as a new region cluster point $P_c$ into a new region cluster $Cl_i$, wherein $P_c$ has a set of Cartesian coordinate values $[x_c, y_c, z_c]$ equal to $[x_s, y_s, z_s]$.

In some embodiments, the method may include, or the instructions, when executed by the processor, may cause the system to perform: for each new region cluster data point $P_c$ in the region cluster $Cl_i$: computing a horizontal distance $d_c$ of the new region cluster data point $P_c$ from an origin $[0, 0, 0]$ of the Cartesian coordinate system of the multi-laser spinning LIDAR sensor based on the formula $d_c = \sqrt{x_c^2 + y_c^2}$; and for each neighboring data point $p_n$ of the region cluster data point $P_c$ in the region cluster $Cl_i$, wherein $p_n$ has a set of Cartesian coordinate values $[x_n, y_n, z_n]$:

determining if the neighboring data point $p_n$ is a ground data point or a ceiling data point;

when the neighboring data point $p_n$ is neither a ground data point nor a ceiling data point, computing a horizontal distance $d_n$ of the neighboring point $P_n$ from the origin $[0, 0, 0]$ of the Cartesian coordinate system of the multi-laser spinning LIDAR sensor based on the formula $d_n = \sqrt{x_n^2 + y_n^2}$; and when a difference between $d_n$ and $d_c$ as determined by $\|d_n - d_c\|$ is less than a pre-defined distance threshold, adding the neighboring data point $p_n$ as a new region cluster data point into the region cluster $Cl_i$.

In some embodiments, the method may include, or the instructions, when executed by the processor, may cause the system to perform: after adding the neighboring data point $p_n$ into the region cluster $Cl_i$: processing the neighboring data point $p_n$ as a new region cluster data point $P_c$ of the region cluster $Cl_i$, in accordance with steps explained above.

In some embodiments, the neighboring data point $p_n$ of a region cluster data point $P_c$ in the region cluster $Cl_i$ is defined as a data point $p_n$ occupying an element of the range map that is immediately surrounding an element occupied by the region cluster data point $P_c$ on the range map.

In some embodiments, determining if the neighboring data point $p_n$ is a ground data point may include: for the neighboring data point $p_n$ and an adjacent neighboring data point $p_{n+1}$ measured by two adjacent laser beams of multi-laser spinning LIDAR sensor, the neighboring data point $p_n$ and the adjacent neighboring data point $p_{n+1}$ each occupying a respective element in two elements in a column of elements in the range map, and wherein the adjacent neighboring data point $p_{n+1}$ has a set of Cartesian coordinate values $[x_{n+1}, y_{n+1}, z_{n+1}]$: computing an inclination value represented by $\vartheta_n$ between the neighboring data point $p_n$ and the adjacent neighboring data point $p_{n+1}$ in accordance with the formula $$\vartheta_n = \operatorname{atan}\left(\frac{z_{n+1} - z_n}{\sqrt{x_{n+1}^2 + y_{n+1}^2} - \sqrt{x_n^2 + y_n^2}}\right);$$

when the value of $\vartheta_n$ is close to 0 degrees, determining the neighboring data point $P_n$ to be a ground data point.

In some embodiments, determining if the neighboring data point $P_n$ is a ceiling data point may include: for the neighboring data point $p_n$ and an adjacent neighboring data point $p_{n+1}$ measured by two adjacent laser beams of the multi-laser spinning LIDAR sensor, the neighboring data point $p_n$ and the adjacent neighboring data point $p_{n+1}$ each occupying a respective element in two elements in a column of elements in the range map, and wherein the adjacent neighboring data point $p_{n+1}$ has a set of Cartesian coordinate values $[x_{n+1}, y_{n+1}, z_{n+1}]$: computing an inclination value represented by $\vartheta_n$ between the neighboring data point $p_n$ and the adjacent neighboring data point $p_{n+1}$ in accordance with the formula:

$$\vartheta_n = \operatorname{atan}\left(\frac{z_{n+1} - z_n}{\sqrt{x_{n+1}^2 + y_{n+1}^2} - \sqrt{x_n^2 + y_n^2}}\right);$$

when the value of $\vartheta_n$ is close to 180 degrees, determining the neighboring data point $p_n$ to be a ceiling data point.

In some embodiments, determining and storing the list of pole clusters or the list of vertical plane clusters may include: removing all region clusters with a total number of data points that is less than a pre-defined cluster threshold from the one or more region clusters; and for each respective region cluster in the one or more region clusters: generating a 3D bounding box for the respective region cluster, the 3D bounding box having a length of dx, a width of dy and a height of dz; and when dz is less than a pre-defined height threshold and $\sqrt{dx^2 + dy^2}$ is less than a pre-defined diagonal threshold, removing the respective region cluster from the one or more region clusters.

In some embodiments, the pre-defined cluster threshold is an integer number between 10 and 20.

In some embodiments, determining and storing the list of pole clusters may include: for each respective region cluster in the one or more region clusters: when dx<1.0 m, dy<1.0 m and a slenderness ratio s, represented by $$s = \frac{dz}{\sqrt{dx^2 + dy^2}},$$

is larger than a pre-defined slenderness threshold, determining and storing the respective region cluster as a pole cluster.

In some embodiments, the slenderness threshold may be a value between 3 and 5.

In some embodiments, determining and storing the list of vertical plane clusters may include: removing the pole clusters from the one or more region clusters; and for each of the remaining region clusters in the one or more region clusters: computing an average cluster curvature value for the respective region cluster based on a respective curvature value of each data point in the respective region cluster; and when the average cluster curvature value for the respective region cluster is less than a pre-defined cluster curvature threshold, determining and storing the respective region cluster as a plane cluster.

BRIEF DESCRIPTION OF THE DRAWINGS

Reference will now be made, by way of example, to the accompanying drawings which show example embodiments of the present application, and in which:

FIG. 6A illustrates an example range map generated based on a 3D point cloud;

FIG. 6B illustrates multiple elements of the range map show in FIG. 6A;

Similar reference numerals may have been used in different figures to denote similar components.

DESCRIPTION OF EXAMPLE EMBODIMENTS

Figure 1:
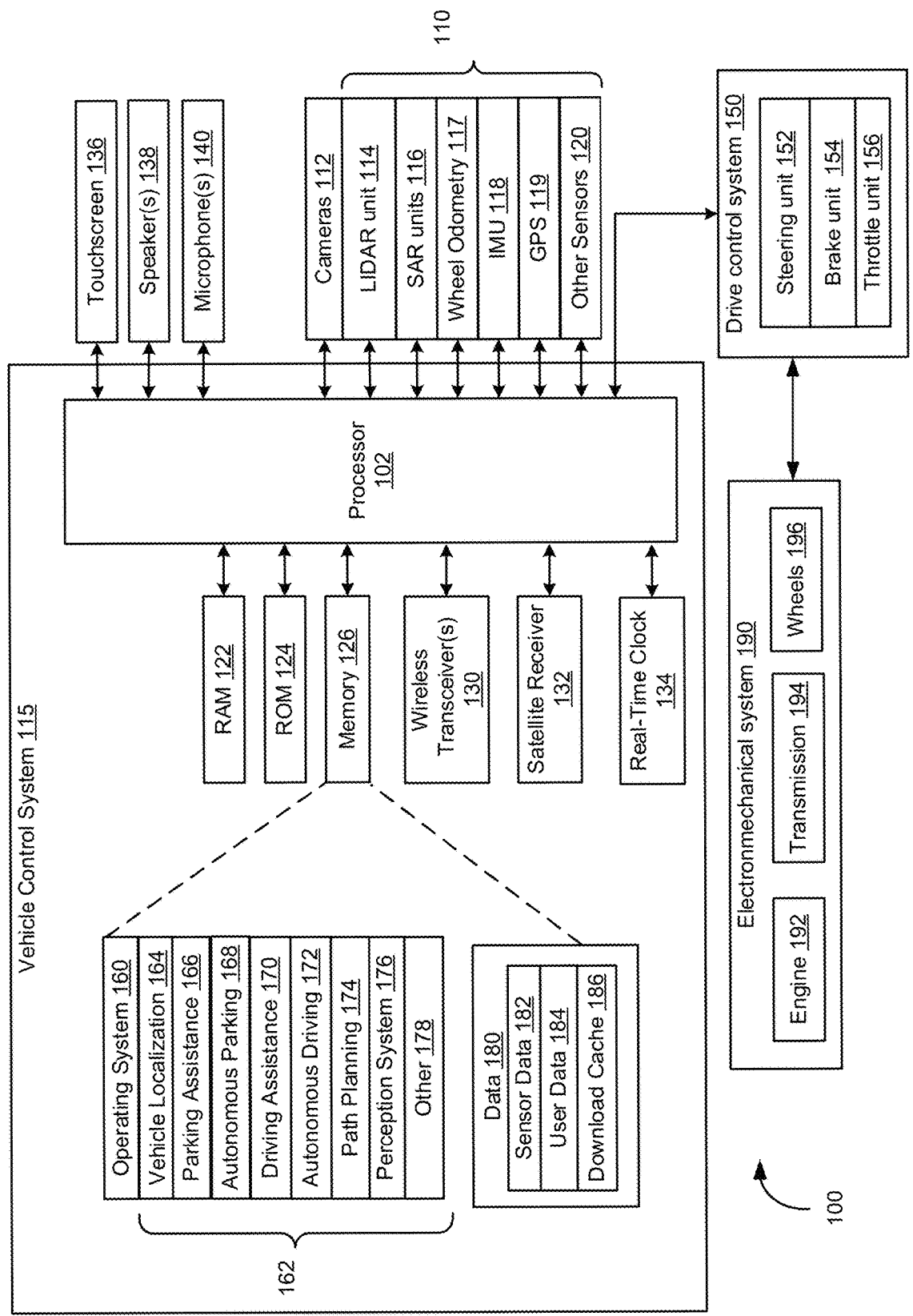
FIG. 1 is a block diagram illustrating some components of an example autonomous vehicle.

In an urban environment, pole-like objects usually correspond to telephone poles, street light and tree trunks. Vertical planes usually correspond to building facades. These pole-like and vertical-plane-like objects are therefore recognized as reliable landmarks for use in localization and mapping for autonomous driving.

The present disclosure describes example embodiments implemented onboard autonomous vehicles to detect and extract landmarks, such as poles and vertical planes, from sparse 3D point clouds in real time. By exploiting unique characteristics of commonly found pole-like or vertical-plane-like objects, the described methods and systems can determine regions of data points in the sparse 3D point cloud likely belonging to a pole or vertical plane, without needing to perform computations to label every single data point of a 3D point cloud, thereby achieving improved computational efficiency.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine readable medium.

For convenience, the present disclosure describes example embodiments of methods and systems for localization of an autonomous vehicle. An autonomous vehicle may be any type of vehicle, such as a motor vehicle, such as a car, truck, bus, boat or ship, submarine, aircraft, warehouse equipment, construction equipment, tractor or other farm equipment. The teachings of the present disclosure are not limited to vehicles, or any particular type of vehicle, and may be applied to other objects, real or virtual, and to vehicles that do not carry passengers as well as vehicles that do carry passengers. The teachings of the present disclosure may also be implemented in non-vehicular mobile robots including, but not limited to, autonomous vacuum cleaners, rovers, lawn mowers, unmanned aerial vehicle (UAV), and other objects. Even though the vehicle control system described herein has been described to facilitate semi or fully autonomous driving, it can also be used for vehicles during non-autonomous driving mode.

FIG. 1 illustrates components of an autonomous vehicle 100 (hereinafter referred to as vehicle 100) in accordance with an example embodiment of the present disclosure. The vehicle 100 comprises a vehicle control system 115 that is connected to sensors of a sensor system 110, a drive control system 150 and a mechanical system 190. The vehicle 100 also comprises various structural elements such as a frame, doors, panels, seats, windows, mirrors and the like that are known in the art but that have been omitted from the present disclosure to avoid obscuring the teachings of the present disclosure. The sensors of the sensor system 110 are mounted to structural elements of the vehicle 100 at various locations on the vehicle 100.

The vehicle control system 115 includes a processor 102 that is coupled to a plurality of internal components of the vehicle 100 via a communication bus (not shown). The processor 102 is coupled to a Random Access Memory (RAM) 122, Read Only Memory (ROM) 124, persistent (non-volatile) memory 126 such as flash erasable programmable read only memory (EPROM) (flash memory), one or more wireless transceivers 130 for exchanging radio frequency signals with a wireless network, a satellite receiver 132 for receiving satellite signals from a satellite network, a real-time clock 134. The vehicle control system 115 is also coupled to other components of the vehicle 100, including the sensors 110, a touchscreen 136, speaker(s) 138, microphone(s) 140, the drive control system 150, and the mechanical system 190.

The one or more wireless transceivers 130 may comprise one or more cellular (RF) transceivers for communicating with a plurality of different radio access networks (e.g., cellular networks) using different wireless data communication protocols and standards. The vehicle control system 115 may communicate with any one of a plurality of fixed transceiver base stations of a wireless WAN (e.g., cellular network) within its geographic coverage area. The one or more wireless transceiver(s) 130 may send and receive signals over a wireless WAN. The one or more wireless transceivers 130 may comprise a multi-band cellular transceiver that supports multiple radio frequency bands.

The one or more wireless transceivers 130 may also comprise a wireless local area network (WLAN) transceiver for communicating with a WLAN (not shown) via a WLAN access point (AP). The WLAN may comprise a Wi-Fi wireless network which conforms to IEEE 802.11x standards (sometimes referred to as Wi-Fi®) or other communication protocol.

The one or more wireless transceivers 130 may also comprise a short-range wireless transceiver, such as a Bluetooth® transceiver, for communicating with a mobile computing device, such as a smartphone or tablet. The one or more wireless transceivers 130 may also comprise other short-range wireless transceivers including but not limited to Near field communication (NFC), IEEE 802.15.3a (also referred to as Ultra Wideband (UWB)), Z-Wave, ZigBee, ANT/ANT+ or infrared (e.g., Infrared Data Association (IrDA) communication).

The real-time clock 134 may comprise a crystal oscillator that provides accurate real-time information, such as those provided by Atmel Corporation.

The touchscreen 136 comprises a display such as a color liquid crystal display (LCD), light-emitting diode (LED) display or active-matrix organic light-emitting diode (AMO-LED) display, with a touch-sensitive input surface or overlay connected to an electronic controller. Additional input devices of the vehicle 100 (not shown) coupled to the processor 102 may also be provided including buttons, switches and dials.

The vehicle control system 115 also includes one or more speakers 138, one or more microphones 140 and one or more data ports 142 such as serial data ports (e.g., Universal Serial Bus (USB) data ports). The system may also include other sensors such as tire pressure sensors (TPSs), door contact switches, light sensors, proximity sensors, etc.

The drive control system 150 serves to control movement of the vehicle 100. The drive control system 150 comprises a steering unit 152, a brake unit 154 and a throttle (or acceleration) unit 156, each of which may be implemented as software modules or control blocks within the drive control system 150. The steering unit 152, brake unit 154 and throttle unit 156 process, when in fully or semi-autonomous driving mode, received path information from a path planning system 174 stored in the memory 126 of the vehicle control system 115 and generate control signals to control the steering, braking and throttle of the vehicle 100, respectively to drive a planned path. The drive control system 150 may include additional components to control other aspects of the vehicle 100 including, for example, control of turn signals and brake lights.

The mechanical system 190 receives control signals from the drive control system 150 to operate the mechanical components of the vehicle 100. The mechanical system 190 effects physical operation of the vehicle 100. The mechanical system 190 comprises an engine 192, a transmission 194 and wheels 196. The engine 192 may be a gasoline-powered engine, a battery-powered engine, a hybrid engine, an electric for example. Other components may be included in the mechanical system 190, including, for example, turn signals, brake lights, fans and windows.

A graphical user interface (GUI) may be rendered and displayed on the touchscreen 136 by the processor 102. A user may interact with the GUI using the touchscreen and optionally other input devices (e.g., buttons, dials) to display relevant information, such as navigation information, driving information, parking information, media player information, climate control information, etc. The GUI may comprise a series of traversable content-specific menus.

The memory 126 of the vehicle control system 115 has stored thereon operating system software 160 that is executed by the processor 102. The memory 126 also has stored thereon a number of software modules collectively referred to as autonomous driving system 162 in addition to the GUI, where each module of the autonomous driving system 162 is software that includes machine-readable instructions executable by the processor 102. The modules of the autonomous driving system 162 include vehicle localization module 164, parking assistance module 166, autonomous parking module 168, driving assistance module 170 for semi-autonomous driving, path planning module 174, perception system 176, and other modules 178. Other modules 178 include for example mapping module, navigation module, climate control module, media player module, telephone module and messaging module, etc. are also stored in the memory 126. In some embodiments, the perception system 176, which may also be referred to as the perception module, when executed by the processor 102, causes the operations of methods described herein to be performed.

Although shown as a separate modules that may be used by the parking assistance module 166, autonomous parking module 168, driving assistance module 170 for semi-autonomous driving, autonomous driving module 172, path planning module 174, or the perception system 176 may be combined with one or more of the other software modules in other embodiments.

The memory 126 also stores a variety of data 180. The data 180 may comprise sensor data 182 received from the sensors of the sensor system 110, user data 184 comprising user preferences, settings and optionally personal media files (e.g., music, videos, directions, etc.), and a download cache 186 comprising data downloaded via the wireless transceivers 130. The sensor data 182 may include image data received from the cameras 112, a three-dimensional point cloud received from the LIDAR sensor 114, radar data received from the radar sensor 116, odometry data received from the wheel odometer 117 and/or an inertial measurement unit (IMU) 118, location data from global positioning system (GPS) sensor 119, and data from other sensors 120. The odometry data received from the wheel odometer 117 includes rotation data indicative of rotation of the wheels of the vehicle 100 and translation data indicative of a translation of the vehicle 100. The odometry data received from the IMU 118 includes three-axis angular velocity of the vehicle 100 and three-axis acceleration of the vehicle 100.

In some embodiments, the processor 102 receives a LIDAR frame from the LIDAR sensor 114 mounted on the vehicle 100 and generates 3D point clouds based on the LIDAR frame received from the LIDAR sensor 114. The perception system 176 can in some embodiments be implemented as a software system as part of a software stack of the autonomous driving system 160 ("ADS software stack").

The LIDAR sensor 114 may capture information in a wide view (e.g., 360° view) about the vehicle 100. The LIDAR unit 114 captures three-dimensional (3D) information about the environment, and generates a three dimensional (3D) point cloud. A point cloud is dataset that represents objects or space. A 3D point cloud includes a set of data points in 3D coordinate system of the LIDAR sensor. It will be appreciate that other types of detection and ranging (DAR) sensors may generate a three-dimensional (3D) point cloud.

Using the camera 112, LIDAR sensor 114, radar sensor 116, odometer 117, the IMU 118, GPS sensor 119, and the other sensors 120, the sensor system 110 may collect information about the local external environment of the vehicle 100 (e.g., any immediately surrounding obstacles) as well as information from a wider vicinity (e.g., the LIDAR sensor 114 may collect information from an area of up to 100-meter radius or more around the vehicle 100). The sensor system 110 may also collect information about the position and orientation of the vehicle 100 relative to a frame of reference (e.g., using the GPS sensor 119). The sensor system 110 may further collect information about the vehicle 100 itself. In such a case, the vehicle 100 may itself be considered part of the sensed environment. For example, the sensor system 110 may collect information from other sensors 120 (e.g., accelerometers, speedometer) and the odometer 117 and/or IMU 118), to determine the state of the vehicle 100, such as linear speed, angular speed, acceleration and tire grip of the vehicle 100. The sensor system 110 may repeatedly (e.g., in regular intervals) receive sensor data 182 from the sensors in real-time. The sensor system 110 may in turn provide sensor data 182 in real-time or near real-time to other components of the vehicle 100, such as for example the path planning module 174 or the autonomous driving module 172.

The sensor system 110 communicates with the perception system 176 via the processor 102 to provide sensor data 182, including a 3D point cloud received from the LIDAR sensor 114 to the perception system 176, which has been implemented to process the 3D point cloud detect and classify objects in the 3D point cloud, for example to detect and classify objects as a pedestrian, building, tree, pole, or another car. The perception system 176 may use any suitable modules to perform object detection or semantic segmentation on a 3D point cloud to detect and classify objects in the 3D point cloud. The perception system 176 in this example includes modules that process the a sparse 3D point cloud to extract landmarks from the sparse 3D point cloud, such as poles or walls, and generate a semantic point cloud as described in detail below.

Figure 4A:
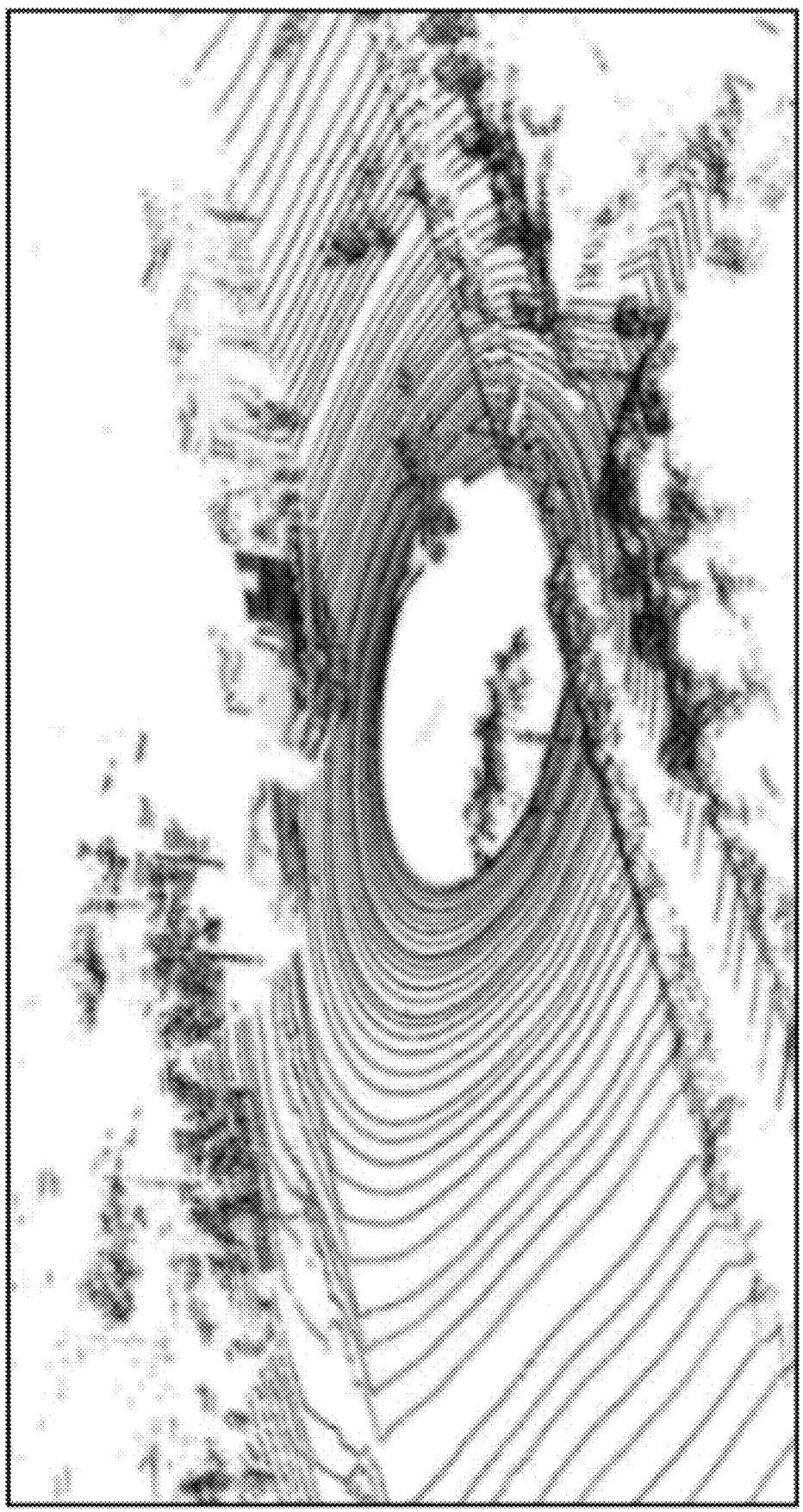
FIG. 4A is an example illustration of a 3D point cloud that can be used as an input to the perception system shown in FIG. 2.
Figure 4B:
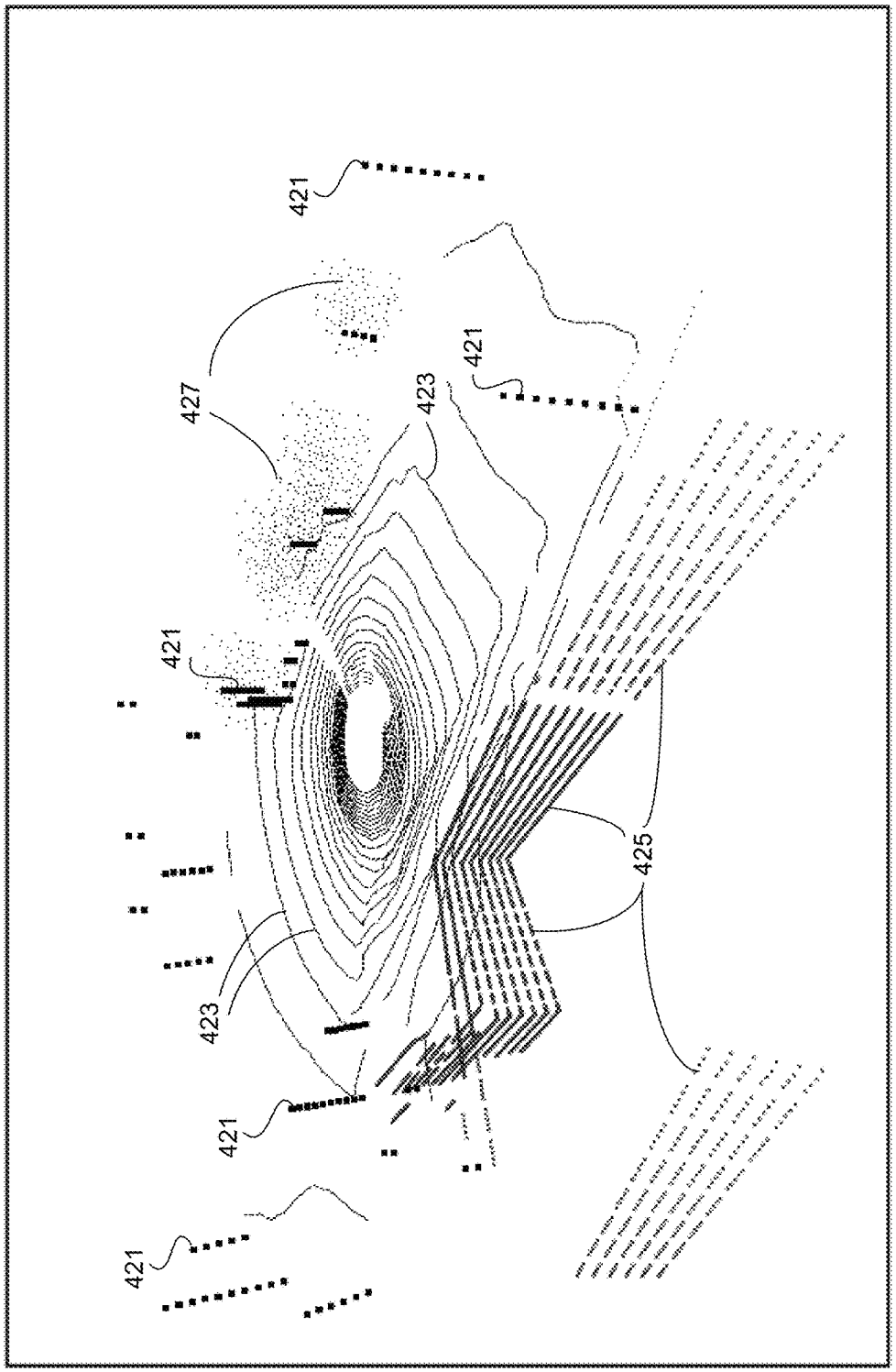
FIG. 4B an example illustration of an output from the perception system shown in FIG. 2.

The modules of the perception system 176 may be implemented using software, which may include any number of independent or interconnected modules. For example, the perception system 176 may be implemented using a dedicated image processor, or may be implemented using one or more general processors of a vehicle controller (not shown) of the vehicle 100. The perception system 176 may repeatedly (e.g., in regular intervals) receive camera data from the sensor system 110 and perform object detection semantic segmentation on the sparse 3D point cloud to detect and classify objects in real-time or near real-time. The output of the perception system 176 may include, for a segmented 3D point cloud in which each pole like object and each vertical plane detected is labelled. For example, as shown in FIG. 4B, a segmented 3D point cloud 420 may include data points 421 for pole-like objects, data points 425 for vertical planes, data points 423 representing the ground, and data points 427 that do not belong to any pole-like object, vertical plane, nor the ground. Each data point 421 belonging to a pole-like object or each data point 425 belonging to a vertical plane may have a set of coordinate values $[x_i, y_i, z_i, c_i]$, where $[x_i, y_i, z_i]$ represents a coordinate of the data point in a Cartesian coordinate system, and $c_i$ is the predicted label for the data point generated by the method of the invention. The segmented point cloud 420 can be used for localization and mapping of the vehicle 100.

In some embodiments, each data point in the segmented 3D point cloud 420 may have a set of coordinate values $[x_i, y_i, z_i, c_i]$, where $[x_i, y_i, z_i]$ represents a coordinate of the data point in a Cartesian coordinate system, and $c_i$ is the predicted label for the data point, which may be used to store a numerical value representative of a specific color. For example, data points 421 for pole-like objects may each have a label storing a value representing the color yellow, data points 425 for vertical planes may each have a label storing a value representing the color white, data points 423 representing the ground may each have a label storing a value representing the color blue, and data points 427 may each have a label storing a value representing the color red. When the label for each data point carries a value encoding a specific color, the segmented 3D point cloud 420 may be rendered in color in accordance with the value stored in each label associated with each data point.

The download cache 186 may be deleted periodically, for example, after a predetermined amount of time. System software, software modules, specific device applications, or parts thereof, may be temporarily loaded into a volatile store, such as RAM 122, which is used for storing runtime data variables and other types of data or information. Data received by the vehicle control system 115 may also be stored in the RAM 122. Although specific functions are described for various types of memory, this is merely one example, and a different assignment of functions to types of memory may also be used.

The vehicle control system 115 comprises a satellite receiver 132 that may use signals received by a satellite receiver from a plurality of satellites in a satellite network to determine its position. The satellite network typically comprises a plurality of satellites which are part of at least one Global Navigation Satellite System (GNSS) that provides autonomous geo-spatial positioning with global coverage. For example, the satellite network may be a constellation of GNSS satellites. Example GNSSs include the United States NAVSTAR Global Positioning System (GPS) or the Russian Global NAvigation Satellite System (GLONASS). Other satellite navigation systems which have been deployed or which are in development include the European Union's Galileo positioning system, China's BeiDou Navigation Satellite System (BDS), the Indian regional satellite navigation system, and the Japanese satellite navigation system.

The vehicle 100 may include other components that are not shown, including, for example, a user interface system and a wireless communication system (e.g., including an antenna). These other components may also provide input to and/or receive output from the above-described systems. The vehicle 100 may communicate with an external system, for example an external map database. The vehicle 100 may also communicate with a network, for example a vehicle network that enables communication among autonomous, semi-autonomous or non-autonomous vehicles.

Figure 3:
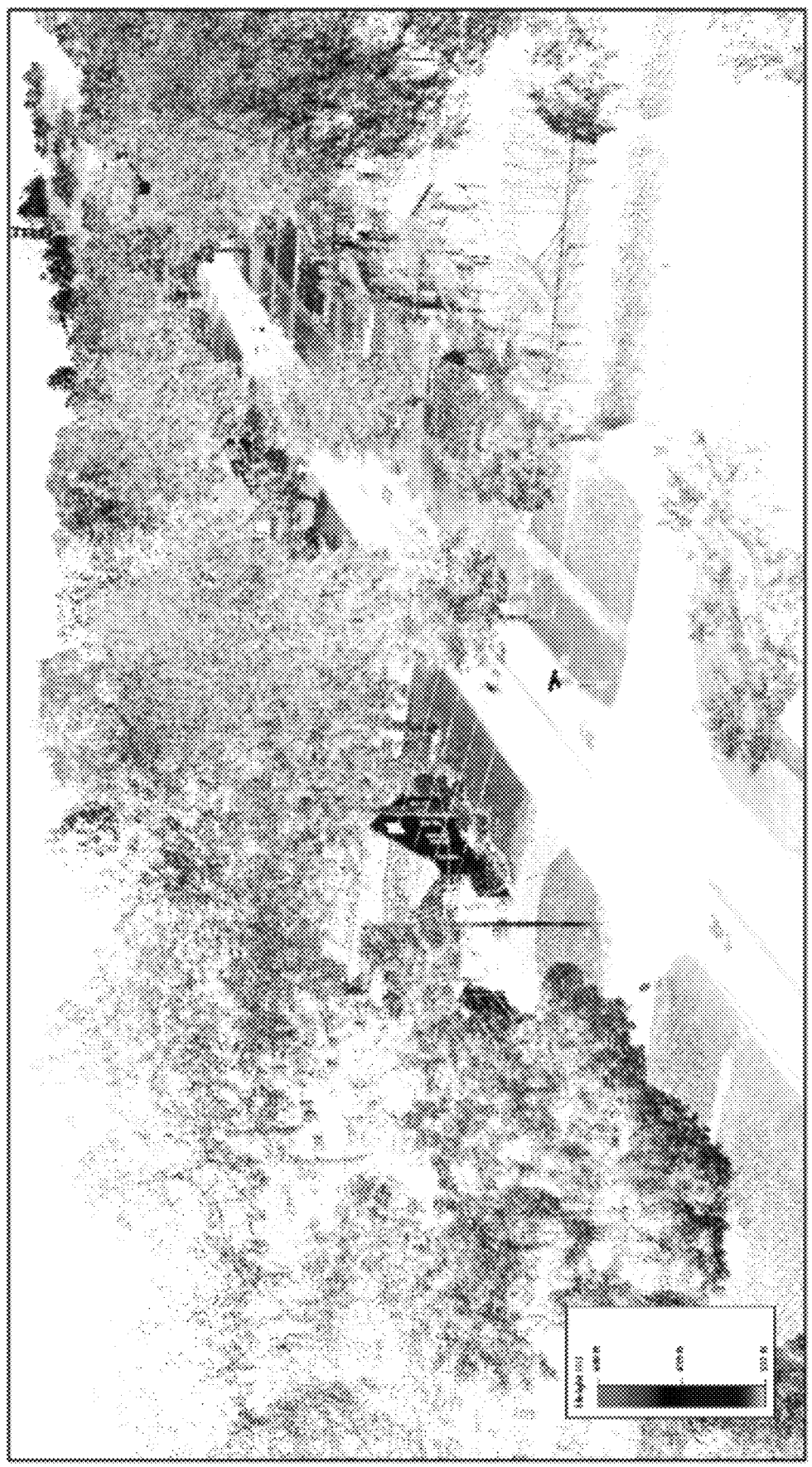
FIG. 3 is an example illustration of a dense point cloud.

As mentioned, existing technologies extract landmarks from a dense 3D point cloud. A dense point cloud 300 is shown in FIG. 3, having a density of least 1,000 points per square meter. Data points included in a dense 3D point cloud are usually evenly distributed on a detected surface of an object. In contrast, the data points of a sparse 3D point cloud tend to gather along scan lines of the laser beams emitted by a spinning scanning LIDAR, instead of being evenly distributed over a detected surface. A sparse 3D point cloud is usually obtained by a spinning scanning LIDAR sensor, such as a Velodyne™ LIDAR sensor, which may have 16 to 128 laser beams that rotate with a relatively low speed (e.g., 10 revolutions per second). Dense 3D point clouds are usually obtained by survey LIDAR sensors. A survey LIDAR sensor generally has just one laser beam that scans in a very high speed (e.g., 200~250 revolutions per second), and in each revolution the survey LIDAR sensor captures much more data points than the typical Velodyne™ LIDAR, so it can create a much denser 3D point cloud.

Processing dense 3D point clouds requires a significant amount of computing resources, including processing and memory resources, which can put significant constraints on a computing platform (i.e. the vehicle control system 115) included an autonomous vehicle (i.e. vehicle 100). Known methods for extracting landmarks from dense 3D point clouds tend to be computationally intensive, and hence are unsuitable for use on autonomous vehicles because autonomous vehicles generally have limited computing and memory resources for executing these known methods. In addition, the LIDAR sensors used by autonomous vehicles generally generate and output sparse 3D point clouds, which are not as dense as the type of point clouds generated by survey LIDAR sensors.

With the described embodiments herein, real time processing of a sparse 3D point cloud is performed to extract landmarks and generate a segmented 3D point cloud for use in mapping and localization for an autonomous vehicle. For example, FIG. 4A is an illustration of a sparse 3D point cloud 400 that can be processed by the described embodiments of perception system 176 to generate lists of one or more landmarks. The landmarks can include pole-like objects and vertical planes.

In one example embodiment, an output of the described system contain a segmented point cloud generated based on a list of region clusters for pole-like objects and/or a list of region clusters for vertical planes. Each list of region cluster includes one or more region clusters, and each region cluster includes a cluster of data points representing a pole-like object or a vertical plane as extracted from the sparse 3D point cloud. For example, FIG. 4B shows a segmented 3D point cloud 420 including data points 421 for pole-like objects, data points 425 for vertical planes, data points 423 representing the ground, and data points 427 that do not belong to any pole-like object, vertical plane, nor the ground. Each data point 421 belonging to a pole-like object or each data point 425 belonging to a vertical plane may have a set of coordinate values $[x_i, y_i, z_i, c_i]$, where $[x_i, y_i, z_i]$ represents a coordinate of the data point in a Cartesian coordinate system, and $c_i$ is the predicted label for the data point.

In some embodiments, each data point in the segmented 3D point cloud 420 may have a set of coordinate values $[x_i, y_i, z_i, c_i]$, where $[x_i, y_i, z_i]$ represents a coordinate of the data point in a Cartesian coordinate system, and $c_i$ is the predicted label for the data point, which may be used to store a numerical value representative of a specific color. For example, data points 421 for pole-like objects may each have a label storing a value representing the color yellow, data points 425 for vertical planes may each have a label storing a value representing the color white, data points 423 representing the ground may each have a label storing a value representing the color blue, and data points 427 may each have a label storing a value representing the color red. When the label for each data point carries a value encoding a specific color, the segmented 3D point cloud 420 may be rendered in color in accordance with the value stored in each label associated with each data point.

The segmented point cloud 420 can be used for localization and mapping of the vehicle 100.

Figure 2:
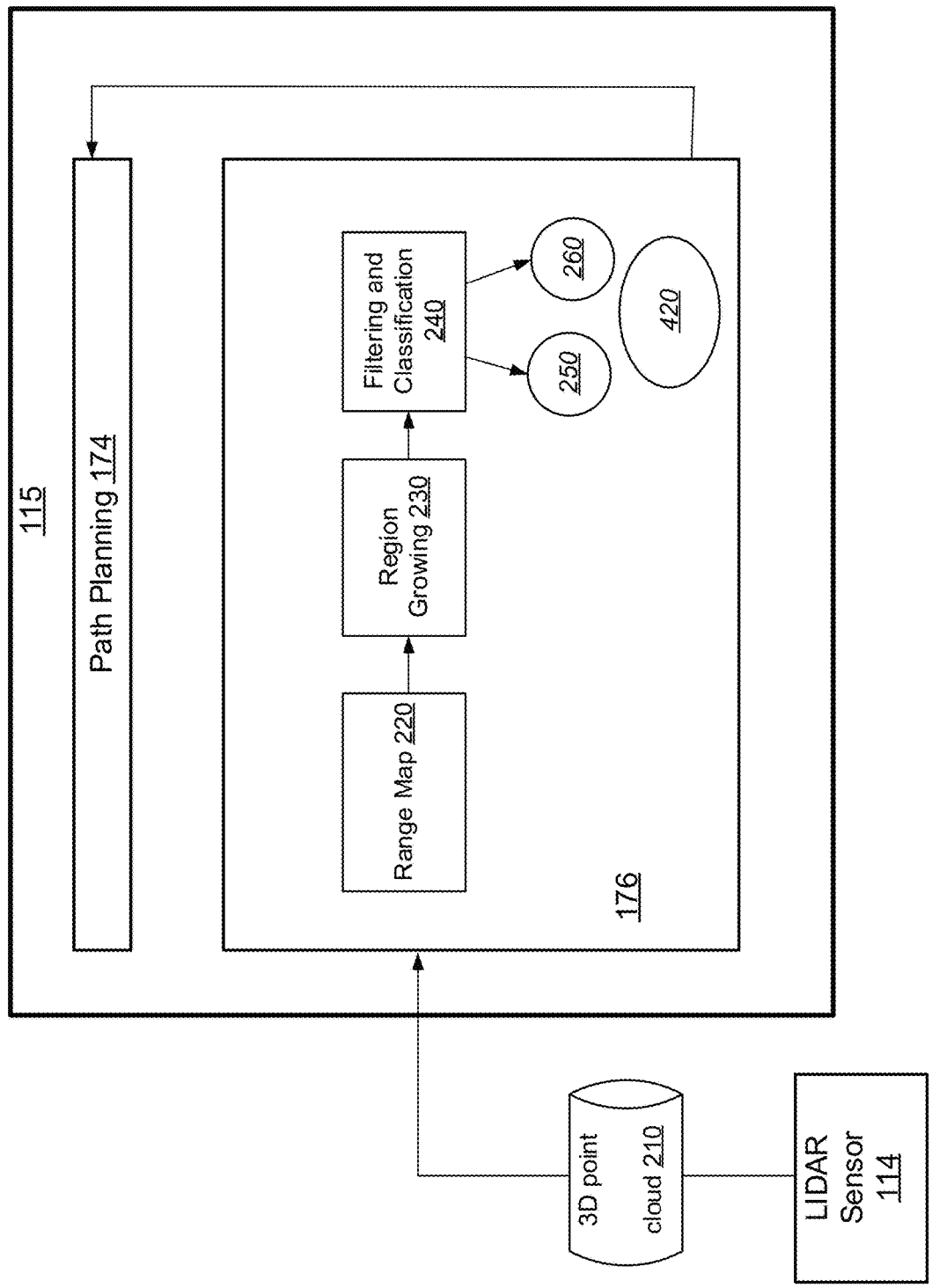
FIG. 2 is a block diagram illustrating example components within a perception system on a vehicle for extracting landmarks from a 3D point cloud.

FIG. 2 shows a block diagram illustrating example modules 220, 230, 240 of the perception system 176 for extracting one or more landmarks from a sparse 3D point cloud 210 and generating a segmented 3D point cloud. The perception system 176 includes a range map module 220, a region growing module 230, and a filtering and classification module 240, each of which contain software instructions stored in memory 126 of the vehicle control system 115. An example process executed by the instructions stored in modules 220, 230, 240 is further described below in connection with FIG. 12. The output of the filtering and classification module 240 can include a list of region clusters 250 for pole-like objects and/or a list of region clusters 260 for vertical planes. Throughout this disclosure, a list of region clusters 250 for pole-like objects may be referred to as a list of pole clusters 250, and a list of region clusters 260 for vertical planes may be referred to as a list of vertical plane clusters 260. The list of pole clusters 250 and/or the list of vertical plane clusters 260 may be used by the perception system 176 to generate a segmented 3D point cloud 420 that is used for localization and mapping of the vehicle 100.

Figure 5A:
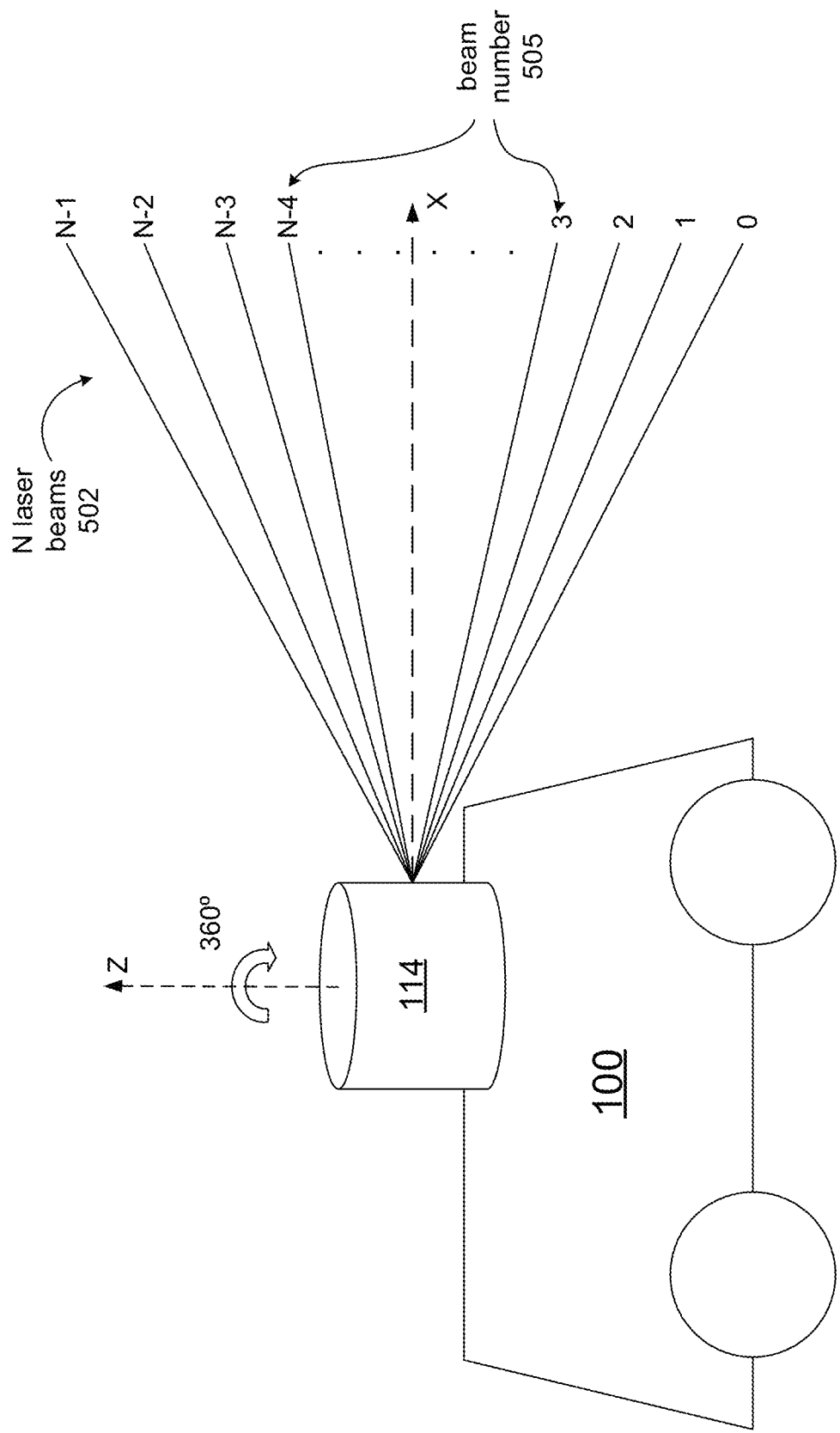
FIG. 5A is a schematic block diagram showing a LIDAR unit and its laser beams.

Also referring to FIG. 5A, a sparse 3D point cloud 210 is generated by the LIDAR sensor 114 of the sensor system 110 by firing and sweeping multiple laser beams (or laser pulses) 502 across the surrounding environment of the vehicle 100. Each data point in the 3D point cloud 210 can be represented by a set of 3D coordinate values in a coordinate system of the LIDAR sensor 114. As will be further described below, the coordinate system of the LIDAR sensor 114 may be spherical or Cartesian, in the frame of reference of the LIDAR sensor 114. Generally, each data point in a 3D point cloud may be represented as a vector containing values of the 3D coordinates, and optionally other values (e.g., additional information such as a beam number 505, intensity of reflected light, or time of firing and detection). A sparse 3D point cloud 210 corresponds to a 360° scan of a physical environment surrounding the vehicle 100. Each sparse 3D point cloud 210 corresponds to a LIDAR frame that has a time stamp (i.e. one observation of the environment 100 resulting from a scan of the environment 100 by the LIDAR sensor 114).

As shown in FIG. 5A, the LIDAR sensor 114 may contain N laser heads, each laser head operable to emit a laser beam or laser pulse 502 at a particular point in time. All laser heads are installed on a spinning base, providing a 360° horizontal field of view. Each laser head has a corresponding beam number 505, which typically starts at 0 and goes up to N−1 for a total of N laser heads. The N laser heads can emit or fire N laser beams 502 in one sector, with each laser head firing a respective laser beam 502. A sector herein refers to one single burst of laser-beam-firing by all the laser heads simultaneously or near simultaneously. In reality, one or more laser heads may not fire simultaneously. There can be a very short time interval (e.g., nanosecond level) between the firing time(s) of multiple laser heads, in each round of firing by the N laser heads at the same Azimuth angle. Relative to a period of scan (e.g., 0.1 second), this nanosecond time interval is negligible, and the LIDAR sensor 114 does not need to output the respective firing time of each laser head down to the nanosecond level. The LIDAR sensor 114 can therefore treat and output the firing time of the N laser heads as that of a single burst of laser-beam firing by all laser heads (i.e., in one sector).

A beam number 505 may also be referred to as a ring number. In some embodiments, the LIDAR sensor 114 may emit 8-128 laser beams 502 per sector at the same time (i.e., $8 \leq N \leq 128$), and each laser head can fire around 2000 times in each 360° rotation. Therefore, each data point Pi in the 3D point cloud 210 is associated with a beam number 505 corresponding to a respective laser head, which has fired the laser beam 502 that has reflected and resulted in the respective data point Pi. In this sense, a data point Pi may be said to be generated by a laser beam emitted or fired by a laser head of the LIDAR sensor 114.

Figure 5B:
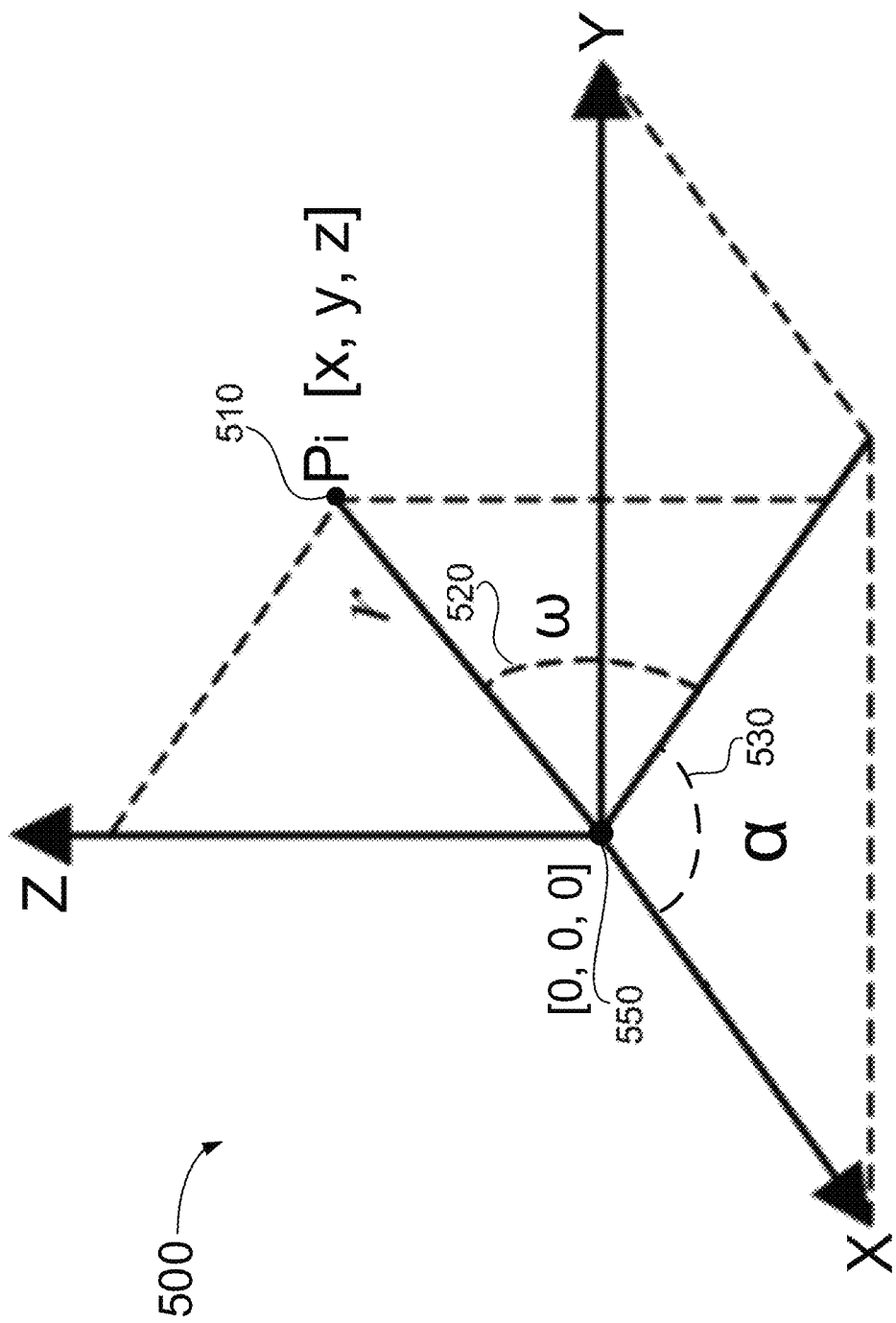
FIG. 5B is a schematic diagram showing a single point in 3D spherical and Cartesian coordinate systems.

FIG. 5B shows a schematic diagram 500 showing a single data point Pi 510 in 3D spherical and Cartesian coordinate systems. When the 3D point cloud 210 includes a total number of M data points, each data point can be referred to as Pi 510, where i=1, 2, ... M. In some embodiments, a data point Pi 510 in a 3D point cloud 210 generated by the LIDAR sensor 114 may be presented in a spherical coordinate system, including r, ω and α: r represents a radial or Euclidean distance between the origin 550 of the spherical coordinate system and the data point $P_i$ 510; ω represents an elevation angle 520 of the point P 510; and α represents an Azimuth angle 530 of the point P 510. Generally speaking, $r \geq 0$, $0° \leq \omega \leq 180°$ (π rad), and $-180° < \alpha \leq 180°$ (or $-\pi < \alpha \leq \pi$).

The radial distance r is computed using time travelled by the laser beam 502. Elevation angle ω 520 is measured from XY-plane, and is positive when the laser beam 502 is above the XY-plane (e.g. for beam numbers 0 to 3 in FIG. 5A) and negative when the laser beam 502 is the XY-plane (e.g. for beam numbers N−3, N−2, and N−1 in FIG. 5A). An elevation angle ω 520 for a laser beam 502 is fixed in the LIDAR unit 114 and may be related to a total number of laser heads N. Azimuth angle α 530 is in XY-plane measured counterclockwise from the X-axis. Azimuth angle α 530 may be dependent upon the position at when a laser beam 502 is fired from a laser head, and is registered at the time of firing of the laser beam 502.

In FIG. 5B, the data point Pi 510 has a corresponding set of Cartesian coordinate values [x,y,z] in a Cartesian coordinate system in the frame of reference of the LIDAR sensor 114. In some embodiments, instead of, or in addition to, a set of coordinates in a spherical coordinate system, the LIDAR sensor 114 may output a set of Cartesian coordinates for each data point Pi 510 in a 3D point cloud 210. For any data point Pi 510 in a 3D point cloud 210 having a set of known spherical coordinates $[r_i, \omega_i, \alpha_i]$, the corresponding Cartesian coordinates $[x_i, y_i, z_i]$ determined based on:

$x_i = r_i \cos \omega_i \cos \alpha_i$, $y_i = r_i \cos \omega_i \sin \alpha_i$, and $z_i = r_i \sin \omega_i$.

On the other hand, for any data point Pi 510 in the 3D point cloud 210 having a known set of Cartesian coordinate values $[x_i, y_i, z_i]$: the radial distance $r_i$ can be computed by $r_i = \sqrt{x_i^2 + y_i^2 + z_i^2}$; the Azimuth angle $\alpha_i$ 530 of the data point Pi 510 can be computed by:

$$\alpha_i = \operatorname{atan}\left(\frac{y_i}{x_i}\right);$$

and the elevation angle $\omega_i$ 520 of the data point Pi 510 can be computed by:

$$\omega_i = \operatorname{atan}\left(\frac{z_i}{\sqrt{x_i^2 + y_i^2}}\right).$$

Referring to FIG. 2 and also to FIG. 6A, a range map module 220 is operable to convert a 3D point cloud 210 into a range map 600, which has a plurality of elements 610, 620. An individual element may be an occupied element 610, or an empty (non-occupied) element 620. FIG. 6A shows the occupied elements 610 as dark color squares. Each data point Pi 510 in the 3D point cloud 210 occupies an individual element 610 in the range map 600, though not all elements of the range map are necessarily occupied by a data point Pi 510 from the point cloud 210. When an individual element 610 is said to be occupied by a data point Pi 510, the element 610 may store or be linked to a set of Cartesian coordinate values $[x_i, y_i, z_i]$ of the respective data point Pi 510. The Cartesian coordinate values $[x_i, y_i, z_i]$ are in the sensor coordinate system, i.e., in the frame of reference of the LIDAR sensor 114. When the set of Cartesian coordinate values $[x_i, y_i, z_i]$ is not provided for a data point Pi 510 in the 3D point cloud 210, the range map module 220 can compute the set of Cartesian coordinate values $[x_i, y_i, z_i]$ for the data point Pi 510 based on its spherical coordinates $[r_i, \omega_i, \alpha_i]$ as described above, and vice versa.

Each element 610, 620 of the range map 600 corresponds to a value along the x-axis of the range map 600 and a value along the y-axis of the range map 600. A value on the x-axis represents an Azimuth angle α 530 in degrees or rad, and ranges from $-180° < \alpha \leq 180°$ (or $-\pi < \alpha \leq \pi$). A value on the y-axis, which is an integer ranging from 0, 1, 2 . . . to N−1, represents a beam number 505 associated with a respective laser head of the LIDAR unit 114, where N represents the total number of laser head of the LIDAR unit 114. In a typical scenario, the value for N can range from 8 to 128. Information regarding beam numbers 505 and Azimuth angles 530 can be obtained from calibration information of the LIDAR sensor 114.

A column 630 of elements in the range map 600 represents a single round of firing by all the laser heads of the LIDAR sensor 114 at a particular point in time, resulting in N laser beams 502, though not all the laser beams 502 may result in a returned signal. For example, if a laser beam 502 has not encountered any surface on its path, the LIDAR sensor 114 may not detect a return signal from the laser beam 502. Therefore, a column 630 may have empty elements 620 as well as occupied elements 610.

A row 640 of elements in the range map 600 corresponds to all the laser beams or pulses 502 fired by a single, respective laser head of the LIDAR sensor 114 in a full sweep or 360° rotation (i.e., during $-180° < \alpha \leq 180°$). In some embodiments, a single laser head can fire or emit a total number of about 2,000 laser pulses per 360° rotation. Each row 640 of elements is therefore associated with its corresponding beam number 505, which is tied to a respective laser head of the LIDAR sensor 114.

An element 610, 620, 655 may be surrounded by eight neighboring elements 650, as shown in FIG. 6B. A neighboring element 650 of an element 655 may be defined as an element immediately surrounding the element 655. A neighboring element 650 may share a common side or a common corner with the element 655. A neighboring element 650 may be an occupied element 610 or an empty element 620. If a neighboring element 650 is an occupied element 610, then the data point occupying the neighboring element 650 is considered to be a neighboring data point $P_n$ of the data point occupying the element 655.

Referring back to FIG. 2, the range map module 220 is operable to convert a 3D point cloud 210 to a range map 600 by mapping each data point Pi 510 in the 3D point cloud 210 to a respective element 610 in the range map 600 based on the beam number 505 and the Azimuth angle 530 of the data point Pi 510. For example, for each row 640 bearing a respective beam number 0, 1, 2 . . . or N−1 from the N beam numbers 505 (see e.g. FIG. 6A), the range map module 220 can first determine an Azimuth angle 530 for each data point Pi 510 in the 3D point cloud 210, and then for each data point Pi 510 associated with the respective beam number 505, mark a respective element 610 of the range map 600 occupied by the respective data point Pi 510 based on the beam number 505 as well as the Azimuth angle 530 of the respective data point Pi 510.

The region growing module 230 is operable to determine a plurality of seed data points from the 3D point cloud 210 based on the range map 600, and generate one or more region clusters using the plurality of seed data points 730. A region cluster includes a cluster of data points Pi 510 representing or resembling an object, which can be a line, a random shape, or a pre-defined shape such as a pole, a tree, or a plane.

Figure 7:
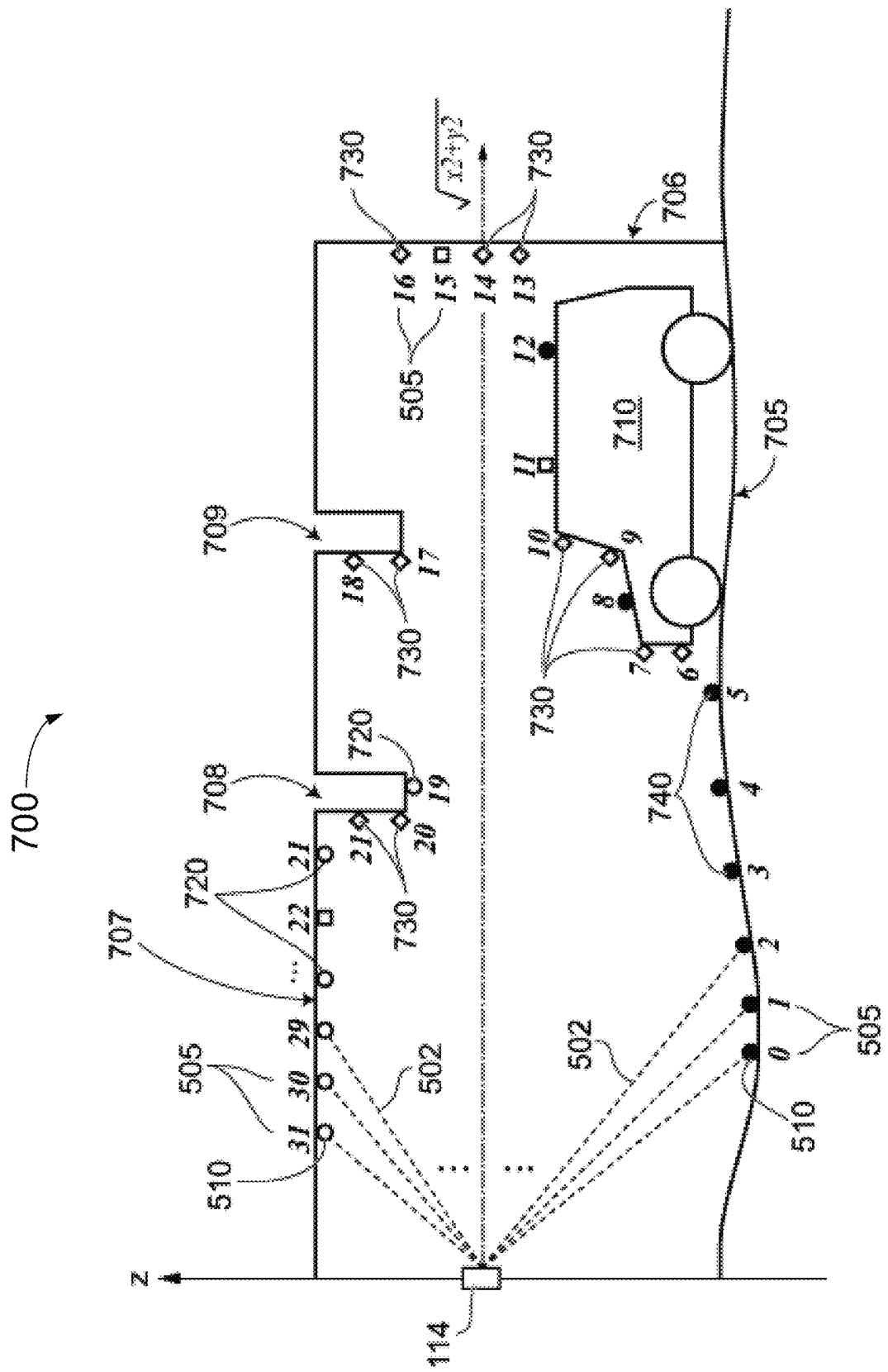
FIG. 7 is a schematic diagram showing example ceiling data points, ground data points and region generating seed data points.

Referring now to FIG. 7, which illustrates a schematic diagram 700 of ceiling data points 720, ground data points 740 and region generating seed data points 730 (or simply "seed data points" 730) obtained in one sector. The ceiling data points 720, ground data points 740 and seed data points 730 can each be classified based on their geographical features, as described below. Diagram 700 shows an example LIDAR sensor 114 firing a plurality of laser beams 502 at a time when a vehicle 710 is within the laser range of LIDAR sensor 114. The LIDAR sensor 114 in this example has 32 laser heads (i.e., N=32), which emits a total of 32 laser beams 502 simultaneously, as shown, where each laser beam 502 is associated with a respective beam number 505 ranging from 0, 1, 2 . . . , to 31. Some laser beams 502, such as those with beam numbers 0 to 5, are reflected off the ground 705; some laser beams 502, such as those with beam numbers 6 to 12, are reflected off a surface of the vehicle 710; some laser beams 502, such as those with beam numbers 13 to 16, are reflected off a vertical wall 706; some laser beams 502, such as those with beam numbers 22 to 31, are reflected off a horizontal surface 707 of the ceiling; and some laser beams 502, such as those with beam numbers 17, 18, 20 and 21 are reflected off a vertical surface 708, 709 of the ceiling. Each time a laser beam 502 is reflected off a surface, be it from the vehicle 710, the ceiling or ground 705, a corresponding data point Pi 510 is generated by the laser beam 502 when the laser beam reflects off a surface. Each data point Pi 510 shown in FIG. 7 therefore occupies a corresponding element 610 in a range map 600 generated by the range map module 220.

The region growing module 230 is configured to determine a plurality of seed data points 730 by scanning each column 630 of the range map 600, and computing an inclination value represented by $\vartheta$ between every pair of two adjacent data points $P_i$ and $P_{i+1}$ in the 3D point cloud 210. It is worth noting that in a 3D point cloud 210, when two adjacent data points $P_i$ and $P_{i+1}$ in the 3D point cloud 210 are generated by two adjacent laser beams 502 (with two adjacent beam numbers 505) fired simultaneously by the LIDAR sensor 114, the two adjacent data points $P_i$ and $P_{i+1}$ occupy two adjacent elements 610 (i.e., the two occupied elements 610 share a common side) in a column 630 of the range map 600, where all the occupied elements 610 of the same column 630 share the same Azimuth angle 530. Therefore, the region growing module 230 can find two adjacent data points $P_i$ and $P_{i+1}$ generated by two adjacent laser beams 502 fired simultaneously by scanning each column 630 of the range map and locating any two adjacent occupied elements 610 in the respective column 630.

Assuming data point $P_i$ has a set of Cartesian coordinate values $[x_i,y_i,z_i]$ and data point $P_{i+1}$ has a set of Cartesian coordinate values $[x_{i+1},y_{i+1},z_{i+1}]$, the inclination value represented by $\vartheta$ between the two adjacent data points $P_i$ and $P_{i+1}$ can be computed in accordance with the formula:

$$\vartheta = \mathrm{atan}\left(\frac{z_{i+1} - z_i}{\sqrt{x_{i+1}^2 + y_{i+1}^2} - \sqrt{x_i^2 + y_i^2}}\right).$$

If and when Cartesian coordinate values are not readily available, they can be computed by the region growing module 230 based on a corresponding set of spherical coordinates of data point $P_i$ and data point $P_{i+1}$.

When the inclination value $\vartheta$ is within a pre-defined inclination threshold, such as 90°, then the region growing module 230 determines one or both of data points $P_i$ and $P_{i+1}$ as seed data points. When data points $P_i$ and $P_{i+1}$ are determined to be seed data points or otherwise, the region growing module 230 moves on to the next pair of adjacent data points $P_{i+2}$ and $P_{i+3}$ in a similar fashion to find the next seed data point. FIG. 7 shows the seed data points 730 in a diamond shape for ease of illustration. As shown, the seed data points 730 are mostly data points on a vertical surface, such as a vertical portion of the vehicle 710, a wall 706, or a vertical surface 708, 709 of the ceiling. A seed data point 730 may be referred to as seed data point $P_s$ throughout the disclosure.

In some embodiments, the pre-defined inclination threshold may be any value within a range of 70° to 110°.

In some embodiments, one or more data points in the 3D point cloud may be missing due to a low reflectivity of the surface or other reasons. FIG. 7 shows the missing data points in a square shape for ease of illustration, such as data points 11, 15 and 22. In such a case, the next adjacent data point is used to compute the inclination value $\vartheta$ between two data points. For example, when data point 15 is missing, data point 14 and data point 16 are used to compute the inclination value $\vartheta$.

In some embodiments, the region growing module 230 is operable to further classify a data point $P_i$ 510 as a ceiling data point 720 or a ground data point 740, when it is not a seed data point 730. For example, when the inclination value $\vartheta$ is close to 0° (e.g. between 0° to 10°), then the region growing module 230 determines one or both of data points $P_i$ and $P_{i+1}$ as ground data points 740. For another example, when the inclination value $\vartheta$ is close to 180° (e.g. between 170° to 180°), then the region growing module 230 determines one or both of data points $P_i$ and $P_{i+1}$ as ceiling data points 720. FIG. 7 shows the ceiling data points 720 and the ground data points 740. Each data point may have a label indicating if the data point is a ceiling data point 720 or a ground data point 740. For example, when a label of a data point indicates that it is a ceiling data point 720, the data point may be shown as red. For another example, when a label of a data point indicates that it is a ground data point 740, the data point may be shown as green. As shown, the ceiling data points 720 are mostly points on a horizontal surface 707 of the ceiling, and the ground data points 740 are mostly points on the ground 705 and occasionally on the vehicle 710.

The region growing module 230 keeps processing each column 630 of the range map 600 to find new seed data points 730 until there are no more occupied elements 610 to be processed in the range map 600. Each seed data point 730, ground data point 740 and ceiling data point 720 may be stored. For example, when a data point $P_i$ 510 is determined to be a seed data point 730, ground data point 740 or ceiling data point 720, its Cartesian and/or spherical coordinates may be added into a respective list of seed data points, a list of ground data points or a list of ceiling data points. For another example, the data point $P_i$ 510 may also be stored in memory with a sub-field indicating a type of data point, where the sub-field includes a label that indicates that the data point is a seed data point 730, a ground data point 740 or a ceiling data point 720.

Once the seed data points 730 are determined, one or more region clusters can be generated based on the seed data points 730. The region growing module 230 is operable to start generating a region from a first seed data point $P_s$ 730 having a set of Cartesian coordinate values $[x_s, y_s, z_s]$ from the plurality of seed data points 730, when the first seed data point $P_s$ 730 has not been grouped into any region cluster. The region growing module 230 can start with a random seed data point $P_s$ 730 at first, and add the first seed data point $P_s$ into a new region cluster $Cl_i$ as a region cluster data point $P_c$ where the region cluster data point $P_c$ has a set of Cartesian coordinate values $[x_c, y_c, z_c]$ equal to $[x_s, y_s, z_s]$.

Every time a region cluster data point $P_c = [x_c, y_c, z_c]$ is added into the region cluster $Cl_i$, the region growing module 230 is operable to perform a set of operations to grow the region cluster $Cl_i$. A first step is to compute a horizontal distance $d_c$ of the new region cluster data point $P_c$ from an origin $[0, 0, 0]$ of the Cartesian coordinate system of the LIDAR sensor 114 based on the formula $d_c = \sqrt{x_c^2 + y_c^2}$, and locate all the neighboring data points $p_n$ of the region cluster data point $P_c$ in the region cluster $Cl_i$. As mentioned above in reference to FIG. 6B, a neighboring data point $p_n$ of a region cluster data point $P_c$ in the region cluster $Cl_i$ is defined as a data point $p_n$ occupying an element 650 of the range map 600 that is immediately surrounding an element 655 occupied by the region cluster data point $P_c$ on the range map 600. Therefore, there may be up to eight neighboring points $p_n$ of any given region cluster point $P_c$, because an occupied element 655 in a range map 600 has up to eight neighboring elements 650 that may be occupied or empty.

Next, the region growing module 230 determines, for each neighboring data point $p_n$ of a region cluster data point $P_c$ in the region cluster $Cl_i$, where the neighboring data point $p_n$ has a set of Cartesian coordinate values $[x_n, y_n, z_n]$, if the neighboring data point $p_n$ is a ground data point 740 or a ceiling data point 720. If neighboring data point $p_n$ is a ground data point 740 or a ceiling data point 720, the region growing module 230 discards the respective neighboring data point $p_n$ as a potential region generating seed data point and proceeds to evaluating the next neighboring data point $p_{n+1}$. This is because ceiling data points and ground data points should be ignored when computing pole-like and vertical wall region clusters.

When the neighboring data point $p_n$ is neither a ground data point 740 nor a ceiling data point 720, the region growing module 230 proceeds to compute a horizontal distance $d_n$ of the neighboring data point $P_n$ from the origin $[0, 0, 0]$ of the Cartesian coordinate system of the LIDAR sensor 114 based on the formula $d_n = \sqrt{x_n^2 + y_n^2}$. When a difference between $d_n$ and $d_c$ as determined by $\|d_n - d_c\|$ is less than a pre-defined distance threshold, the region growing module 230 adds the neighboring data point $p_n$ as a region cluster point $P_{c+1}$ into the region cluster $Cl_i$. The pre-defined distance threshold may be for example a value between 0.1 meters (m) to 0.3 meters (m).

Once a neighboring data point $p_n$ is added into the region cluster $Cl_i$ as a region cluster point $P_{c+1}$, where $[x_{c+1}, y_{c+1}, z_{c+1}]$ equal to $[x_n, y_n, z_n]$, the region growing module 230 can perform the same set of operations described above to grow the region cluster $Cl_i$, starting with computing a horizontal distance $d_{c+1}$ of the region cluster data point $P_{c+1}$ based on $d_{c+1} = \sqrt{x_{c+1}^2 + y_{c+1}^2}$, and locating all the neighboring data points $p_n$ of the region cluster point $P_{c+1}$ in the region cluster $Cl_i$, then to finding out if each neighboring data point $p_n$ of $P_{c+1}$ is a suitable candidate for being added into the region cluster $Cl_i$.

In some embodiments, for each region cluster data point $P_c$ added into a region cluster $Cl_i$, the region growing module 230 is configured to find and temporarily store all the neighboring data points $p_n$ (up to eight) of the region cluster data point $P_c$ that should be added into the region cluster $Cl_i$, prior to adding each of the neighboring data points $p_n$ into the region cluster $Cl_i$ and initiating the process to locate further neighboring data points (of each region cluster data point $P_c$) to grow the region cluster.

The region growing module 230 continues the recursive process described above to find additional region cluster data points $P_c$ for a region cluster $Cl_i$, until no new data points can be found that can be added into the region cluster $Cl_i$, which means that the region cluster is completed. At this point, the region growing module 230 stores the completed region cluster $Cl_i$ in a memory and assigns a unique number or identifier (e.g. 001) for the region cluster $Cl_i$. The module 230 then proceeds to find the next seed data point $P_{s+1}$ 730 that has not yet been grouped into any region cluster, and grows the next region cluster $Cl_{i+1}$ based on this seed data point $P_{s+1}$ 730 and its neighboring data points on the range map 600. This process continues until there are no more seed data points 730 in the range map 600 that have not yet been grouped into any region cluster. It is worth noting that a seed data point $P_s$ 730 may be also added into a region cluster $Cl_i$ at any time as a qualifying neighboring data point $p_n$ of an existing region cluster data point $P_c$ of the region cluster $Cl_i$ during this process; and once the seed data point $P_s$ 730 has been added a region cluster $Cl_i$, it can no longer start a new region cluster on its own.

The final output of the region growing module 230 is a list of region clusters $\{C_1, Cl_2, Cl_3 \ldots Cl_L\}$, where L is the total number of region clusters found based on all the seed data points 730 in a range map 600. Each region clusters $Cl_i$, $i=1, 2, 3 \ldots L$, includes a group of region cluster data points $P_{ci}$, each data point having a set of Cartesian coordinates in the frame of reference of the LIDAR sensor 114.

Figure 8:
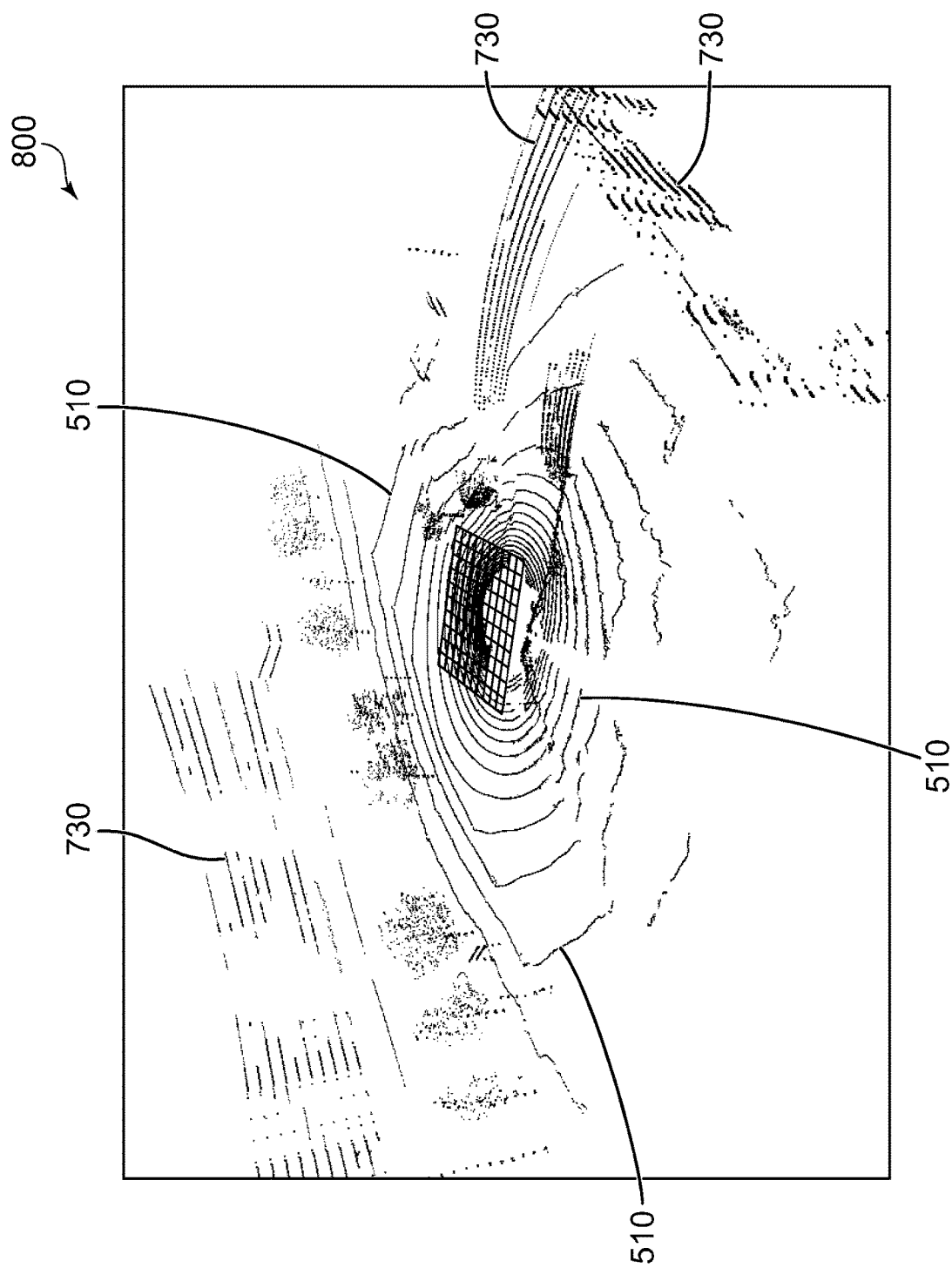
FIG. 8 illustrates example region generating seed data points in view of a raw 3D point cloud.
Figure 9:
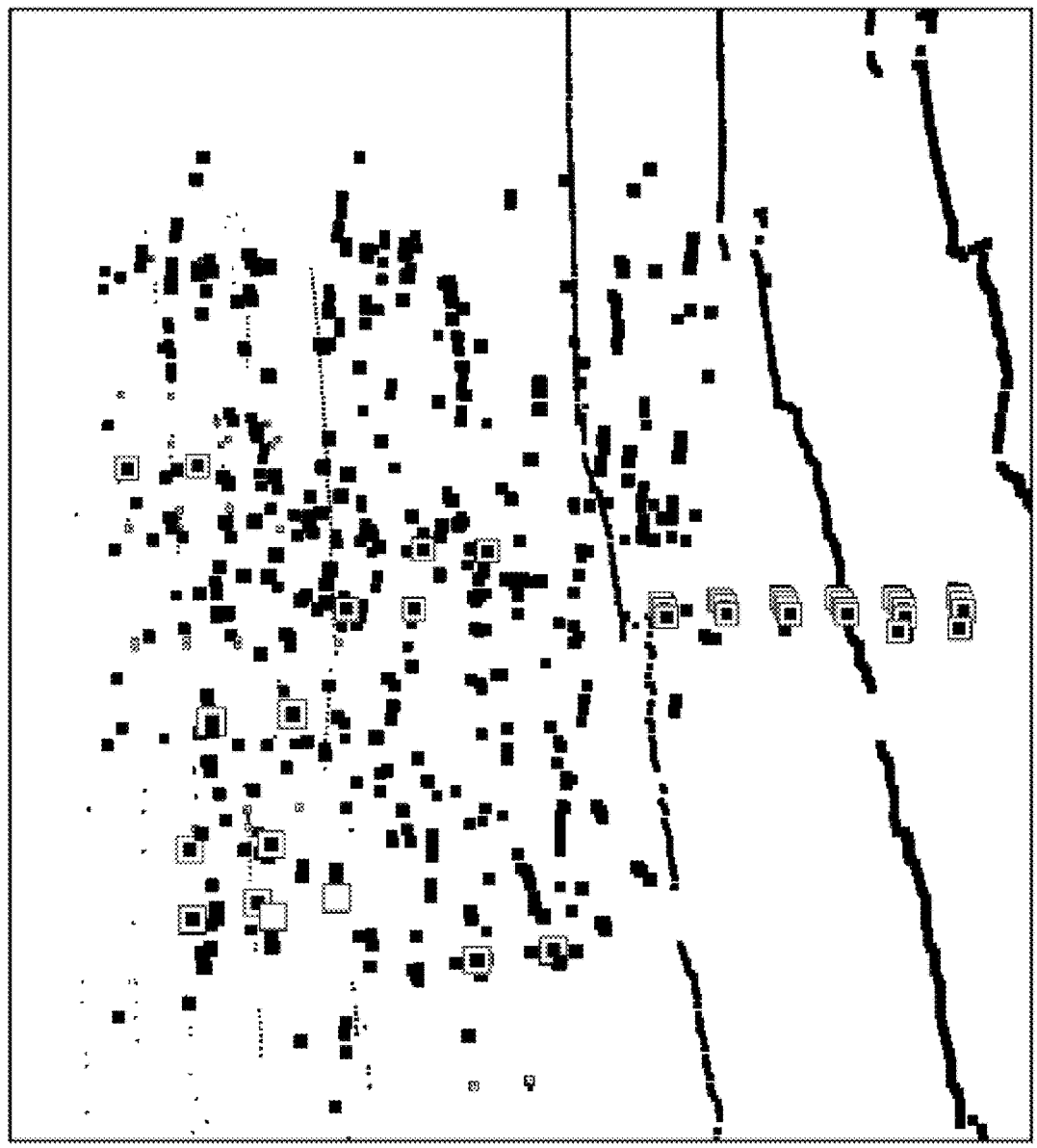
FIG. 9 illustrates noise around region generating seed data points in view of a raw 3D point cloud.

FIG. 8 shows an illustration 800 of region generating seed data points 730 in view of 3D point cloud 210. Each data point in the 3D point cloud 210 may have a label indicating if the data point is a region generating seed data point 730 or otherwise. In some embodiments, the label in each data point may be used to render the point cloud in color for ease of illustration. For example, when a label of a data point indicates that it is a data point 510 from a point cloud 210, the data point 510 may be shown as red. For another example, when a label of a data point indicates that it is a region generating seed data point 730, the region generating seed data point 730 may be shown as light blue. As shown, most of the region generating seed data point 730 are part of vertical objects such as pole-like objects (including tree trunks) and vertical walls. Still, some seed data points 730 may be less desirable for the purpose of extracting stable landmarks, such as points from a tree crown, as shown in the upper portion of the illustration 900 in FIG. 9. This happens occasionally, as a few pairs of points from a tree crown may just happen to be adjacent points on a range map that have an inclination value of around 90°.

The filtering and classification module 240 is configured to perform a set of filtering operations to fine-tune the region clusters $\{Cl_1, Cl_2, Cl_3 \ldots Cl_L\}$, where L is the total number of region clusters, from the region growing module 230, and to best eliminate noise such as data points and clusters most likely from less stable objects (e.g. tree crowns). In some embodiments, the filtering and classification module 240 is operable to, as a first filtering operation, remove all region clusters with a total number of data points that is less than a pre-defined cluster threshold from the region clusters $\{Cl_1, Cl_2, Cl_3 \ldots Cl_L\}$, to get an updated list of region clusters $\{C_{1'}, Cl_{2'}, Cl_{3'} \ldots Cl_F\}$, where F represents the total number of region clusters after the first filtering operation. The pre-defined cluster threshold may be for example 10 or 20.

In some embodiments, the filtering and classification module 240 may be configured to, as a second filtering operation, remove clusters that are deemed too small, based on the dimensions of each respective region cluster $Cl_i$. For example, for each respective region cluster $Cl_i$ in the existing region clusters, the filtering and classification module 240 can generate a 3D bounding box for the region cluster $Cl_i$ with a length dx, a width dy and a height dz. The existing region clusters may be $\{C_1, Cl_2, Cl_3 \ldots Cl_L\}$ if the first filtering operation has not been performed, or $\{Cl_1, Cl_2, Cl_{3'} \ldots Cl_F\}$ if the first filtering operation has been performed. When dz is less than a pre-defined height threshold and $dx^2 + dy^2$ is less than a pre-defined diagonal threshold, the filtering and classification module 240 is operable to remove the corresponding region cluster $Cl_i$ from the region clusters $\{Cl_1, Cl_2, Cl_3 \ldots Cl_L\}$ or $\{Cl_{1'}, Cl_{2'}, Cl_{3'} \ldots Cl_F\}$. What remains is another updated list of region clusters $\{Cl_{1''}, Cl_{2''}, Cl_{3''} \ldots Cl_S\}$, where S represents the total number of region clusters after the second filtering operation. The pre-defined height threshold may be, for example, a value between 1 to 3 meters, such as 2 m. The pre-defined diagonal threshold may be, for example, a value between 7 to 10 meters, such as 8 m. The second filtering operation may be performed without the first filtering operation, or may be performed only after the first filtering operation has been performed.

In some embodiments, the filtering and classification module 240 may be configured to, as a third filtering operation, determine region clusters resembling pole-like objects from the list of existing region clusters by estimating the dimensions for each region cluster $Cl_i$ in the existing region clusters. The existing region clusters may be $\{Cl_1, Cl_2, Cl_3 \ldots Cl_L\}$, $\{Cl_{1'}, Cl_{2'}, Cl_{3'} \ldots Cl_F\}$, or $\{Cl_{1''}, Cl_{2''}, Cl_{3''} \ldots Cl_S\}$, depending on if the first and/or second operation has been performed prior to this step. To estimate the dimensions, the filtering and classification module 240 may generate a 3D bounding box for each region cluster $Cl_i$ with length dx, a width dy and a height dz. When dx is less than a pole-length threshold, dy is less than a pole-width threshold, and a slenderness ratio s, represented by $$\frac{dz}{\sqrt{dx^2 + dy^2}},$$

is larger than a pre-defined slenderness threshold, the filtering and classification module 240 may and store the respective region cluster $Cl_i$ as a region cluster for pole-like object in a list of pole clusters. The third filtering operation may be performed without the first or second filtering operation, or may be performed only after the first and second filtering operations have been performed.

In some embodiments, the pole-length threshold may be any value between 0.5 to 2 meters (e.g., 1 m), the pole-width threshold may be any value between 0.5 to 2 meters (e.g., 1 m), and the slenderness threshold may be any value between 2 to 5 (e.g., 3).

In some embodiments, the filtering and classification module 240 may be configured to, as a fourth filtering operation, determine region clusters for vertical planes from the list of existing region clusters by determining an average curvature value of each region cluster $Cl_i$. As a pre-processing step, the filtering and classification module 240 may first remove all the region clusters for pole-like objects obtained in the third filtering operation from the existing region clusters, which may be $\{Cl_1, Cl_2, Cl_3 \ldots Cl_L\}$, $\{Cl_{1'}, Cl_{2'}, Cl_{3'} \ldots Cl_F\}$, or $\{Cl_{1''}, Cl_{2''}, Cl_{3''} \ldots Cl_S\}$, depending on if the first or second operation has been performed prior to the third filtering operation. The remaining region clusters can be big in size; some of them represent vertical plane of buildings and some of them might be tree crowns. If the average curvature value of a region cluster $Cl_i$ is less than a given threshold, the data points in the region cluster $Cl_i$ can be labelled as data points for a vertical plane, and the region cluster $Cl_i$ can be stored as a region cluster for a vertical plane.

For each data point $P_i$ 510 occupying a respective element 610 of the range map 600 and having a set of coordinate values $[x_i, y_i, z_i]$, the curvature value of the data point $P_i$ can be represented by c and computed by the formula below:

$$c = \frac{\sqrt{\left(2kx_i - \sum_{j=i-k, j \neq i}^{i+k} x_j\right)^2 + \left(2ky_i - \sum_{j=i-k, j \neq i}^{i+k} y_j\right)^2 + \left(2kz_i - \sum_{j=i-k, j \neq i}^{i+k} z_j\right)^2}}{(x_i^2 + y_i^2 + z_i^2)},$$

where $[x_j, y_j, z_j]$ represents a set of Cartesian coordinate values of each adjacent data point $P_j$ in a plurality of adjacent data points in the 3D point cloud 210. The plurality of adjacent data points are generated by one or more laser beams emitted by the same laser head of the LIDAR sensor 114 that has emitted data point $P_i$ 510 and therefore occupy the same row 640 of the corresponding range map 600 of the 3D point cloud 210. k is a total number of adjacent data points $P_j$, j={1, 2 ... k} on each side of data point $P_i$ 510 in the row 640 of elements in the range map 600, and the total number of plurality of adjacent data points $P_j$ is 2×k.

In some embodiments, k has a value ranging from 2 to 5.

Still as part of the fourth filtering operation to determine the list of region clusters for vertical wall or planes, the filtering and classification module 240 is operable to compute an average cluster curvature value for the respective region cluster $Cl_j$ based on a respective curvature value of each data point $P_i$ 510 (which is also a region cluster data point $P_c$) in the region cluster $Cl_j$, for example by computing a mean curvature value based on the respective curvature value of each data point $P_i$ 510 in the region cluster $Cl_j$. When the average cluster curvature value for the respective region cluster $Cl_j$ is less than a pre-defined cluster curvature threshold, the filtering and classification module 240 can determine and store the respective region cluster the filtering and classification module 240 as a region clusters for vertical planes (or "vertical plane cluster"), and add it to a list of vertical plane clusters.

In some embodiments, the pre-defined cluster curvature threshold is a value between 0.2 to 0.5, e.g. 0.25.

Figure 10:
FIG. 10 is another example illustration of a 3D point cloud that can be used as an input to the computer vision system shown in FIG. 2.
Figure 11:
FIG. 11 is another example illustration of an output from the computer vision system shown in FIG. 2.

FIG. 10 is an example illustration 1000 of a sparse 3D point cloud 210 that can be used as an input to the range map module 220 in order to generate one or more region clusters for pole-like objects and vertical planes. The green data points represent points reflected off vertical objects including pole-like objects and planes. FIG. 11 is an example illustration 1100 of a point cloud rendered based on the output from the filtering and classification module 240, generated from an input of the point cloud 210 shown in FIG. 10. The point cloud 210 in 1100 includes region clusters of pole-like objects and region clusters of vertical planes. In some embodiments, for ease of illustration, a label in each point cloud may be used to store a value representing a color. For example, the point cloud 210 in 1100 may include region clusters of pole-like objects and region clusters of vertical planes rendered in white, while region clusters of other objects may be rendered in dark grey or black.

Figure 12:
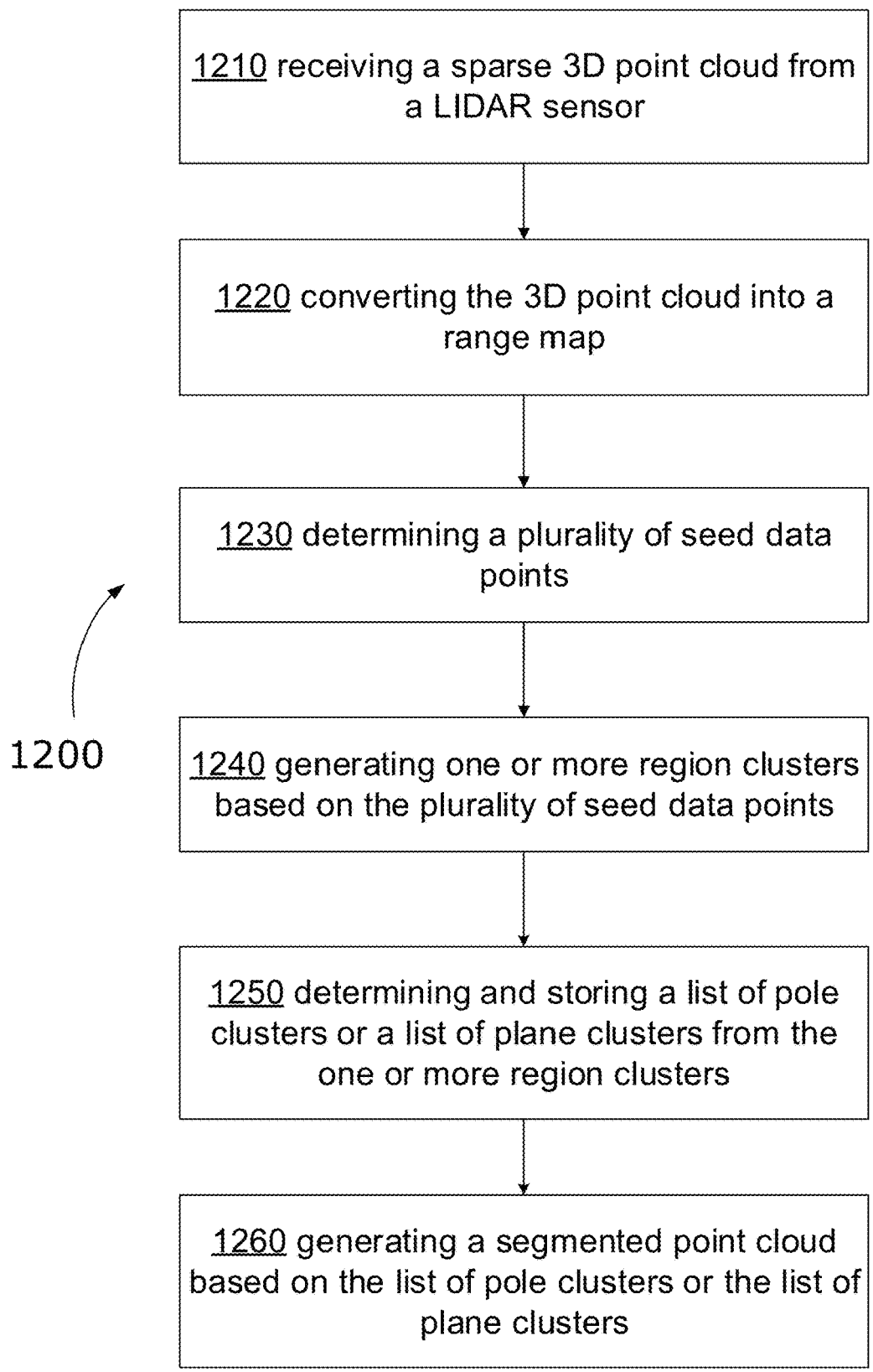
FIG. 12 is a flow chart illustrating an example method for extracting landmarks from a 3D point cloud.

FIG. 12 is a flow chart illustrating an example method 1200 for generating a list of pole clusters 250 and/or a list of (vertical) plane clusters 260 from a 3D point cloud 210. The method 1200 may be implemented as software instructions stored in one or more modules of the perception system 176, such as the range map module 220, the region growing module 230, and the filtering and classification module 240. In some embodiments, one or more of the range map module 220, the region growing module 230, and the filtering and classification module 240 may be part of the same module, or may be further implemented as sub-modules. The method 1200 may be executed by one or more processors 102 of the vehicle control system 115 in real time or near real time, as the vehicle 100 is operating in an environment and receiving 3D point clouds 210 over time from the LIDAR sensor 114. At step 1210, the perception system 176 receives a sparse 3D point cloud 210 from the LIDAR sensor 114. The 3 sparse D point cloud 210 includes a plurality of data points $P_i$ 510, where i=1, 2, . . . M, and M represents a total number of data points 510 in the 3D point cloud 210. A data point $P_i$ 510 may be represented by a set of spherical coordinates $[r_i, \omega_i, \alpha_i]$, or a set of Cartesian coordinates $[x_i, y_i, z_i]$, or both.

For any data point Pi 510 in a 3D point cloud 210 having a set of known spherical coordinates $[r_i, \omega_i, \alpha_i]$, the corresponding Cartesian coordinates $[x_i, y_i, z_i]$ determined based on:

$x_i = r_i \cos \omega_i \cos \alpha_i,$ $y_i = r_i \cos \omega_i \sin \alpha_i,$ and $z_i = r_i \sin \omega_i.$ On the other hand, for any data point Pi 510 in the 3D point cloud 210 having a known set of Cartesian coordinate values $[x_i, y_i, z_i]$: the radial distance $r_i$ can be computed by $r_i = \sqrt{x_i^2 + y_i^2 + z_i^2}$; the Azimuth angle $\alpha_i$ 530 of the data point Pi 510 can be computed by:

$$\alpha_i = \operatorname{atan}\left(\frac{y_i}{x_i}\right);$$

and the elevation angle $\omega_i$ 520 of the data point Pi 510 can be computed by:

$$\omega_i = \operatorname{atan}\left(\frac{z_i}{\sqrt{x_i^2 + y_i^2}}\right).$$

At step 1220, the perception system 176 converts the 3D point cloud 210 into a corresponding range map 600. This may be performed by a range map module 220. The range map may have a plurality of elements 610, 620. An individual element may be an occupied element 610, or an empty (non-occupied) element 620. Each data point Pi 510 in the 3D point cloud 210 occupies an individual element 610 in the range map 600, though not all elements of the range map are necessarily occupied by a data point Pi 510 from the point cloud 210. When an individual element 610 is said to be occupied by a data point Pi 510 from the 3D point cloud 210, the element 610 may store or be linked to a set of Cartesian coordinate values $[x_i, y_i, z_i]$ of the respective data point Pi 510. When the set of Cartesian coordinate values $[x_i, y_i, z_i]$ is not provided for a data point Pi 510 in the 3D point cloud 210, the range map module 220 can compute the set of Cartesian coordinate values $[x_i, y_i, z_i]$ for the data point Pi based on its spherical coordinates $[r_i, \omega_i, \alpha_i]$ as described above, and vice versa.

Each element 610, 620 of the range map 600 corresponds to a value along the x-axis of the range map 600 and a value along the y-axis of the range map 600. A value on the x-axis represents an Azimuth angle $\alpha$ 530 in degrees or rad, and ranges from $-180° < \alpha \leq 180°$ (or $-\pi < \alpha \leq \pi$). A value on the y-axis, which is an integer ranging from 0, 1, 2 . . . to N−1, represents a beam number 505 associated with a respective laser head of the LIDAR sensor 114, where N represents the total number of laser heads of the LIDAR sensor 114. In a typical scenario, the value for N can range from 8 to 128, such as 32 or 64. Information regarding beam numbers 505 and Azimuth angles 530 can be obtained from calibration information of the LIDAR sensor 114.

In some embodiments, the range map module 220 is operable to convert the 3D point cloud 210 to the range map 600 by mapping each data point Pi 510 in the point cloud 210 to a respective element 610 in the range map 600 based on the beam number 505 and the Azimuth angle 530 of the point Pi 510. For example, for each row 640 bearing a respective beam number 0, 1, 2 . . . or N−1 from the N beam numbers 505 (see e.g. FIG. 6A), the range map module 220 can first determine an Azimuth angle 530 for each data point Pi 510 in the 3D point cloud 210, and then for each data point Pi 510 associated with the respective beam number 505, mark a respective element 610 of the range map 600 occupied by the respective point 510 based on the beam number 505 as well as the Azimuth angle 530 of the respective data point Pi 510.

Figure 13:
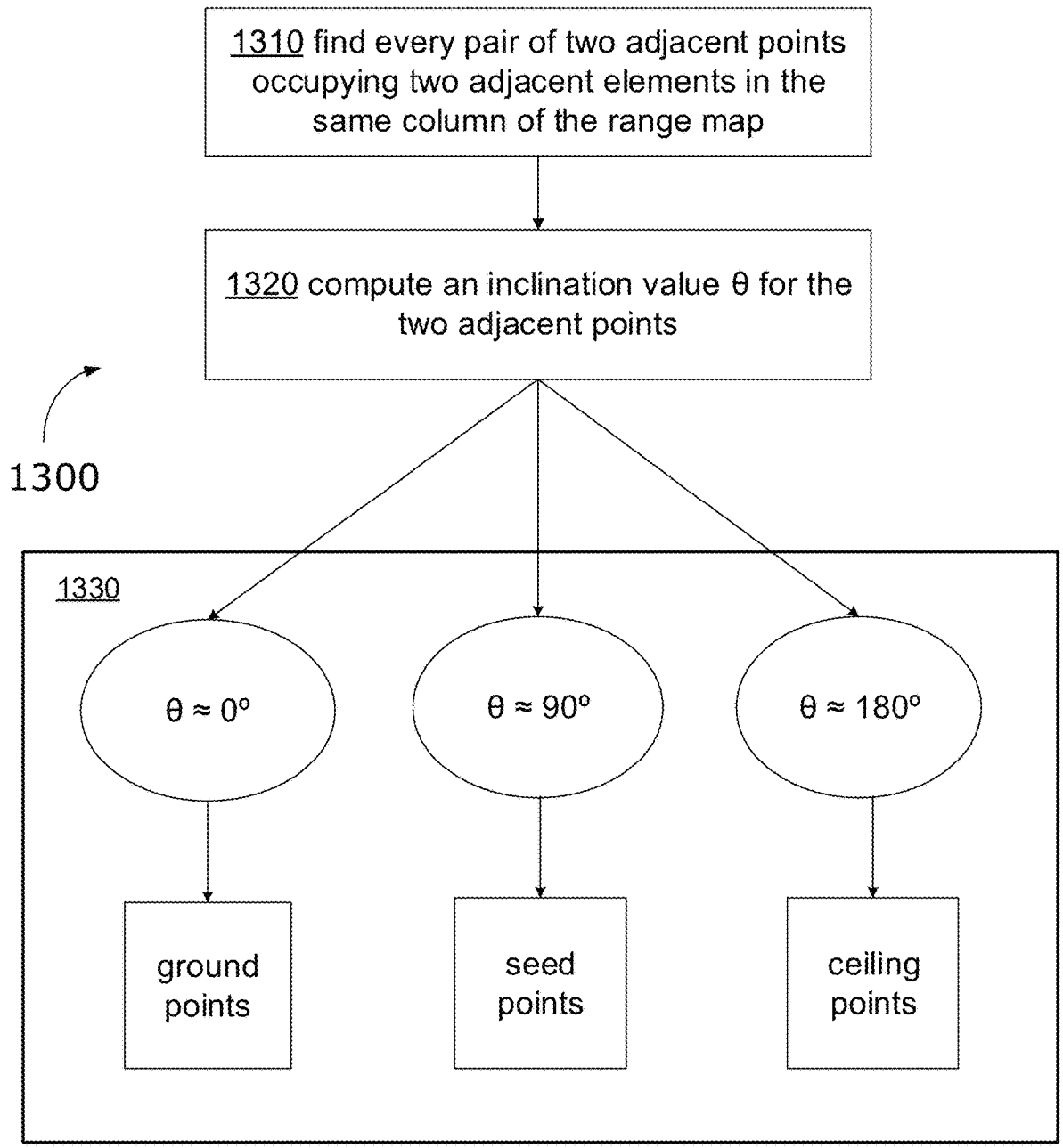
FIG. 13 is a flow chart illustrating an example method for determining region generating seed data points.

At step 1230, the perception system 176 determines a plurality of region generating seed data points 730 based on the range map 600. This may be performed by a region growing module 230. FIG. 13 is a flow chart illustrating an example method 1300 for determining region generating seed data points 730 seed data point in this step.

At step 1310 of method 1300, the region growing module 230 is configured to scan each column 630 of the range map 600, find every pair of two adjacent data points $P_i$ and $P_{i+1}$ occupying two adjacent elements 610 in the same column 630. When two adjacent data points $P_i$ and $P_{i+1}$ in the 3D point cloud 210 are generated by two adjacent laser beams 502 (with two adjacent beam numbers 505) fired simultaneously by the LIDAR sensor 114 and reflected off one or more surfaces, the two adjacent data points $P_i$ and $P_{i+1}$ occupy two adjacent elements 610 in a column 630 of the range map 600. Therefore, the region growing module 230 can find two adjacent data points $P_i$ and $P_{i+1}$ measured by two adjacent laser beams 502 fired simultaneously by scanning each column 630 of the range map and locating any two adjacent occupied elements 610 in the respective column 630.

At step 1320, the region growing module 230 computes, for each pair of two adjacent data points $P_i$ and $P_{i+1}$ found in step 1310, an inclination value $\vartheta$ between the two adjacent data points $P_i$ and $P_{i+1}$. Assuming $P_i$ has a set of Cartesian coordinate values $[x_i, y_i, z_i]$ and $P_{i+1}$ has a set of Cartesian coordinate values $[x_{i+1}, y_{i+1}, z_{i+1}]$, the inclination value represented by $\vartheta$ between the two adjacent data points $P_i$ and $P_{i+1}$ can be computed in accordance with the formula:

$$\vartheta = \operatorname{atan}\left(\frac{z_{i+1} - z_i}{\sqrt{x_{i+1}^2 + y_{i+1}^2} - \sqrt{x_i^2 + y_i^2}}\right).$$

If and when Cartesian coordinate values are not readily available, they can be computed by the region growing module 230 based on a corresponding set of spherical coordinates of data point $P_i$ and data point $P_{i+1}$.

At step 1330, when the inclination value $\vartheta$ is within a pre-defined inclination threshold, such as 90°, then the region growing module 230 determines one or both of data point $P_i$ and data point $P_{i+1}$ as seed data points 730. When data point $P_i$ and data point $P_{i+1}$ are determined to be seed data points or otherwise, the region growing module 230 moves on to the next pair of adjacent data points $P_{i+2}$ and $P_{i+3}$ in a similar fashion to find the next seed data point. In some embodiments, the pre-defined inclination threshold may be any value within a range of 70° to 110°.

When the inclination value $\vartheta$ is close to 0° (e.g. between 0° to 10°), then the region growing module 230 determines one or both of data points $P_i$ and $P_{i+1}$ as ground data points 740. When the inclination value $\vartheta$ is close to 180° (e.g. between 170° to 180°), then the region growing module 230 determines one or both of data points $P_i$ and $P_{i+1}$ as ceiling data points 720.

The region growing module 230 keeps processing each column 630 of the range map 600 to find new seed data points 730 until there are no more occupied elements 610 to be processed in the range map 600. Each seed data point 730, ground data point 740 and ceiling data point 720 may be stored. For example, when a data point Pi is determined to be a seed data point 730, ground data point 740 or ceiling data point 720, its Cartesian and/or spherical coordinates may be added into a respective list of seed data point 730, ground data point 740 or ceiling data point 720.

Figure 14:
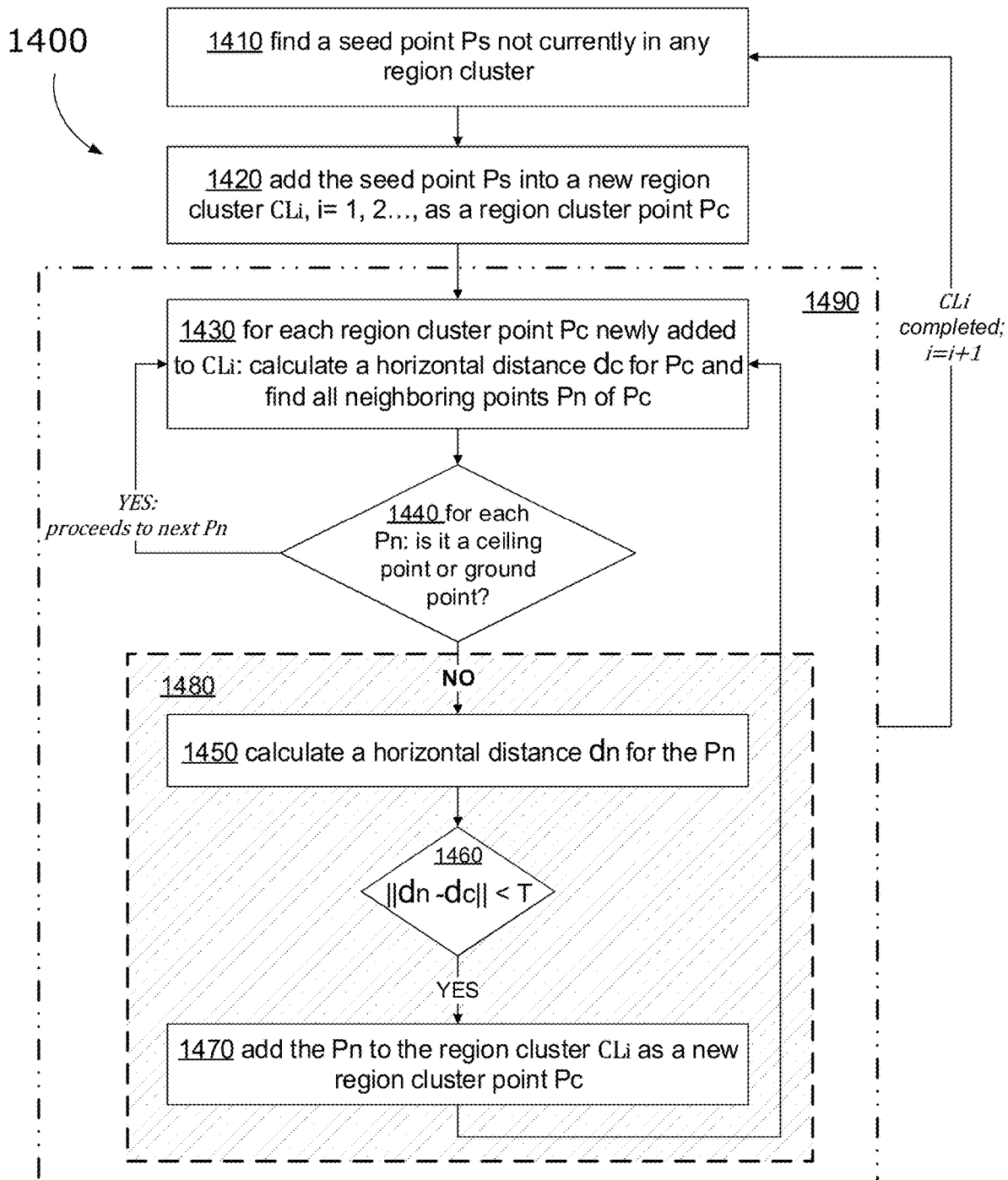
FIG. 14 is a flow chart illustrating an example method for generating region clusters based on region generating seed data points.

Referring back to FIG. 12, at step 1240, the perception system 176 generates one or more region clusters based on the plurality of seed data points 730. This may be performed by a region growing module 230. A region cluster includes a cluster of data points $P_i$ representing or resembling an object, which can be a line, a random shape, or a pre-defined shape such as a pole, a tree, or a plane. FIG. 14 is a flow chart illustrating an example method 1400 for generating region clusters based on the seed data points 730 found in step 1230 of method 1200.

At step 1410 of method 1400, the region growing module 230 finds a seed data point $P_s$ 730 having a set of Cartesian coordinate values $[x_s, y_s, z_s]$ from the plurality of seed data points 730, where seed data point $P_s$ 730 has not been grouped or classified into any region cluster.

At step 1420, the region growing module 230 adds the seed data point $P_s$ 730 into a new region cluster $Cl_i$ as a region cluster point $P_c$ where region cluster data point $P_c$ has a set of Cartesian coordinate values $[x_c, y_c, z_c]$ equal to $[x_s, y_s, z_s]$.

Every time a region cluster data point $P_c = [x_c, y_c, z_c]$ is added into the region cluster $Cl_i$, the region growing module 230 performs a recursive process 1490, which starts with step 1430. At step 1430, the region growing module 230 computes a horizontal distance $d_c$ of the region cluster point $P_c$ from an origin [0, 0, 0] of the Cartesian coordinate system of the LIDAR sensor 114 based on the formula $d_c = \sqrt{x_c^2 + y_c^2}$, and locate all the neighboring data points $p_n$ of the region cluster data point $P_c$ in the region cluster $Cl_i$.

As mentioned above in reference to FIG. 6B, a neighboring data point $p_n$ of a region cluster data point $P_c$ in the region cluster $Cl_i$ is defined as a data point $p_n$ occupying an element 650 of the range map 600 that is immediately surrounding an element 655 occupied by the region cluster data point $P_c$ on the range map 600. Therefore, there may be up to eight neighboring data points $p_n$ of any given region cluster data point $P_c$, because an occupied element 655 in a range map 600 has up to eight neighboring elements 650 that may be occupied or empty.

At step 1440, which is also a part of the recursive process 1490, the region growing module 230 determines, for each neighboring data point $p_n$ of the region cluster data point $P_c$ in the region cluster $Cl_i$, where each neighboring data point $p_n$ has a set of Cartesian coordinate values $[x_n, y_n, z_n]$, if and when the neighboring data point $p_n$ is a ground data point 740 or a ceiling data point 720. If the neighboring data point $p_n$ is a ground data point 740 or a ceiling data point 720, the region growing module 230 discards the neighboring data point $p_n$ as a potential region generating seed data point and proceeds to evaluating the next neighboring data point $p_{n+1}$.

When the neighboring data point $p_n$ is neither a ground data point 740 nor a ceiling data point 720, steps 1450, 1460 and 1470 collectively form part of a process 1480 that is performed for each neighboring data point $p_n$ of the region cluster data point $P_c$ in the region cluster $Cl_i$ that is neither a ground data point 740 nor a ceiling data point 720.

At step 1450, the region growing module 230 proceeds to compute a horizontal distance $d_n$ of the neighboring data point $P_n$ from the origin [0, 0, 0] of the Cartesian coordinate system of the LIDAR sensor 114 based on the formula $d_n = \sqrt{x_n^2 + y_n^2}$.

At step 1460, the region growing module 230 determines a difference between $d_n$ and $d_c$ based on the formula $\|d_n - d_c\|$.

At step 1470, when $\|d_n - d_c\|$ is less than a pre defined distance threshold T, the region growing module 230 adds the neighboring data point $p_n$ as a region cluster point $P_{c+1}$ into the region cluster $Cl_i$. The pre-defined distance threshold T may be for example a value between 0.1 meters (m) to 0.3 meters (m).

Once a neighboring data point $p_n$ is added into the region cluster $Cl_i$ as a region cluster point $P_{c+1}$, where $[x_{c+1}, y_{c+1}, z_{c+1}]$ equal to $[x_n, y_n, z_n]$, the region growing module 230 can perform the recursive process 1490, which includes steps 1430 to 1470, described above to grow the region cluster $Cl_i$.

The region growing module 230 continues the recursive process 1490 described above to find additional region cluster points $P_c$ for a region cluster $Cl_i$, until no data points of the sparse 3D point cloud can be found that can be added into the region cluster $Cl_i$, which means that the region cluster is completed. The region growing module 230 then stores the completed region cluster $Cl_i$ in a memory and assigns a unique number or identifier (e.g. 001) for the region cluster $Cl_i$.

The module 230 then starts at step 1410 again and proceeds to find the next seed data point $P_{s+1}$ 730, that has not yet been grouped into any region cluster, and grows the next region cluster $Cl_{i+1}$ based on this seed data point $P_{s+1}$ 730 and its neighboring data points $p_n$ on the range map 600. This process continues until there are no more seed data points 730 in the range map 600 that has not yet been grouped into any region cluster.

The final output of the region growing module 230 is a list of region clusters $\{Cl_1, Cl_2 Cl_3 \ldots Cl_L\}$, where L is the total number of region clusters found based on all the seed data points 730 in a range map 600. Each region clusters $Cl_i$, i=1, 2, 3 … L, includes a group of region cluster data points $P_{c^i}$, each data point $P_{c^i}$ having a set of Cartesian coordinates in the frame of reference of the LIDAR sensor 114.

At step 1250, the perception system 176 determines and stores one or both of a list of pole clusters 250 and list of vertical plane clusters 260. This may be performed by a filtering and classification module 240. The filtering and classification module 240 is operable to, as a first filtering operation, remove all region clusters with a total number of data points that is less than a pre-defined cluster threshold from the region clusters $\{Cl_1, Cl_2, Cl_3 \ldots Cl_L\}$, to get an updated list of region clusters $\{Cl_{1'}, Cl_{2'}, Cl_{3'} \ldots Cl_{F'}\}$, where F represents the total number of region clusters after the first filtering operation. The pre-defined cluster threshold may be for example 10 or 20.

Next, the filtering and classification module 240 may be configured to, as a second filtering operation, remove clusters that are deemed too small, based on the dimensions of each respective region cluster $Cl_i$. For example, for each respective region cluster $Cl_i$ in the existing region clusters, the filtering and classification module 240 can generate a 3D bounding box for the region cluster $Cl_i$ with a length dx, a width dy and a height dz. When dz is less than a pre-defined height threshold and $\sqrt{dx^2+dy^2}$ is less than a pre-defined diagonal threshold, the filtering and classification module 240 is operable to remove the corresponding region cluster $Cl_i$ from the region clusters $\{Cl_{1'}, Cl_{2'}, Cl_{3'} \ldots Cl_{F'}\}$. What remains is another updated list of region clusters $\{Cl_{1''}, Cl_{2''}, Cl_{3''} \ldots Cl_S\}$, where S represents the total number of region clusters after the second filtering operation. The pre-defined height threshold may be, for example, 2 meters. The pre-defined diagonal threshold may be, for example, 8 meters.

The filtering and classification module 240 may be further configured to, as a third filtering operation, determine region clusters resembling pole-like objects from the list of existing region clusters by estimating the dimensions for each region cluster $Cl_i$ in $\{Cl_{1''}, Cl_{2''}, Cl_{3''} \ldots Cl_S\}$. To estimate the dimensions, the filtering and classification module 240 looks again at the dimensions of the 3D bounding box for each region cluster $Cl_i$ with length dx, width dy and height dz.

When dx is less than a pole-length threshold (e.g., 1 m), dy is less than a pole-width threshold (e.g., 1 m), and a slenderness ratio $$s = \frac{dz}{\sqrt{dx^2+dy^2}}$$

is larger than a pre-defined slenderness threshold (e.g., 3), the filtering and classification module 240 may and store the respective region cluster $Cl_i$ as a region cluster for pole-like object in a list of pole clusters 250.

In some embodiments, the filtering and classification module 240 may be configured to, as a fourth filtering operation, determine region clusters for vertical planes from the list of existing region clusters by determining an average curvature value of each region cluster $Cl_i$. As a pre-processing step, the filtering and classification module 240 may first remove all the region clusters for pole-like objects obtained in the third filtering operation from $\{Cl_{1''}, Cl_{2''}, Cl_{3''} \ldots Cl_S\}$. If the average curvature value of a region cluster $Cl_i$ is less than a given threshold, the region cluster $Cl_i$ can be classified and stored as a region cluster for a vertical plane. Compared to a learning based method, using the average curvature value of a region cluster to determine a shape of the region cluster is faster and more efficient.

The filtering and classification module 240 can compute an average cluster curvature value for the respective region cluster $Cl_i$ based on a respective curvature value of each data point $P_i$ 510 in the region cluster $Cl_i$, for example by calculating a mean curvature value based on the respective curvature value of each point $P_i$ 510 in the region cluster $Cl_i$. When the average cluster curvature value for the respective region cluster $Cl_i$ is less than a pre-defined cluster curvature threshold (e.g., 0.25), the filtering and classification module 240 can determine and store the respective region cluster the filtering and classification module 240 as a region clusters for vertical planes (or "vertical plane cluster"), and add it to a list of vertical plane clusters 260.

At step 1260, the perception system 176 may generate a segmented point cloud 420 based on the list of pole clusters or the list of plane clusters. As shown in FIG. 4B, the segmented point cloud 420 may include data points 421 for pole-like objects, data points 425 for vertical planes, data points 423 representing the ground, and data points 427 that do not belong to any pole-like object, vertical plane, nor the ground. Each data point 421 belonging to a pole-like object or each data point 425 belonging to a vertical plane may have a set of coordinate values $[x_i, y_i, z_i, c_i]$, where $[x_i, y_i, z_i]$ represents a coordinate of the data point in a Cartesian coordinate system, and $c_i$ is the predicted label for the data point generated by the method of the invention.

In some embodiments, each data point in the segmented 3D point cloud 420 may have a set of coordinate values $[x_i, y_i, z_i, c_i]$, where $[x_i, y_i, z_i]$ represents a coordinate of the data point in a Cartesian coordinate system, and $c_i$ is the predicted label for the data point, which may be used to store a numerical value representative of a specific color. For example, data points 421 for pole-like objects may each have a label storing a value representing the color yellow, data points 425 for vertical planes may each have a label storing a value representing the color white, data points 423 representing the ground may each have a label storing a value representing the color blue, and data points 427 may each have a label storing a value representing the color red. When the label for each data point carries a value encoding a specific color, the segmented 3D point cloud 420 may be rendered in color in accordance with the value stored in each label associated with each data point. The segmented point cloud 420 can be used for localization and mapping of the vehicle 100.

Traditional simultaneous localization and mapping method of a sparse 3D point cloud is typically based on an occupancy grid map, which works well for detecting a ground, but not very effective for detecting a ceiling. The methods described herein use a range map and compute an inclination value between points on adjacent elements on a range map in order to recognize both ground and ceiling data points in a fast and efficient manner. Furthermore, as each element of the range map contains at most one data point of the sparse 3D point cloud, using the range map to label data points for region clusters encounters less distortion than using an occupancy grid map.

Furthermore, the region generating seed data points are extracted by leveraging characteristics of a spinning LiDAR sensor with beam numbers. Essentially, the step of finding region generating seed data points amounts to a pre-selection of potential landmarks, where a large number of data points are skipped when they are not suitable as seed data points to grow region clusters. This methodology saves a significant amount of computing resources (i.e., processing and memory resources), which might be otherwise wasted by performing computations to label every single data point in the 3D point cloud, thereby providing a technical advantage for a mobile computing platform on a vehicle 100 in real time.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A computer-implemented method of processing a sparse three dimensional (3D) point cloud to generate a segmented point cloud in real time, comprising:

receiving a sparse 3D point cloud captured by a multi-laser spinning light detection and ranging (LIDAR) sensor mounted to a vehicle, the sparse 3D point cloud comprising a plurality of data points, each of the plurality of data points in the sparse 3D point cloud having a set of coordinates in a coordinate system of the multi-laser spinning LIDAR sensor and being associated with a beam number from a plurality of beam numbers of the multi-laser spinning LIDAR sensor, each respective beam number from the plurality of beam numbers corresponding to a respective laser head of the multi-laser spinning LIDAR sensor;

generating, from the sparse 3D point cloud, a range map comprising a plurality of elements, each element of the range map corresponding to a value representing an Azimuth angle along an x-axis of the range map and a value representing an integer number along a y-axis of the range map, the x-axis having values ranging from −180 degrees to +180 degrees, the y-axis having integer numbers ranging from 0 to N−1, wherein N represents a total number of laser heads of the multi-laser spinning LIDAR sensor of the vehicle, and each integer number along the y-axis corresponds to a respective beam number from the plurality of beam numbers, each of the plurality of data points of the sparse 3D point cloud occupying a respective element of the plurality of elements;

for each beam number from the plurality of beam numbers, determining the Azimuth angle for each data point in the plurality of data points that is associated with the beam number;

for each data point from the plurality of data points associated with the beam number, marking a respective element of the range map as occupied by the respective data point based on the Azimuth angle and the associated beam number of the respective data point;

computing and storing a curvature value for each of the plurality of data points of the sparse 3D point cloud, wherein for any data point $P_i$ occupying a respective element of the range map and having a set of coordinate values $[x_i, y_i, z_i]$ the curvature value of the data point $P_i$ is represented by c and computed by:

$$c = \frac{\sqrt{\left(2kx_i - \sum_{j=i-k, j \neq i}^{i+k} x_j\right)^2 + \left(2ky_i - \sum_{j=i-k, j \neq i}^{i+k} y_j\right)^2 + \left(2kz_i - \sum_{j=i-k, j \neq i}^{i+k} z_j\right)^2}}{(x_i^2 + y_i^2 + z_i^2)},$$

where values $[x_j, y_j, z_j]$, represents a set of Cartesian coordinate values of each adjacent data point $P_j$ in a plurality of adjacent data points in the sparse 3D point cloud, wherein the plurality of adjacent data points are generated by one or more laser beams emitted by the same laser head of the multi-laser spinning LIDAR sensor that has emitted the laser beam that generated $P_i$, and k is a total number of adjacent data points $P_j$, j={1, 2 . . . k} on each side of data point $P_i$ in a row of elements in the range map, and where k has a value ranging from 2 to 5;

labelling the data point in each respective element of the range map as one of a pole-like data point or a vertical-plane-like data point;

determining a plurality of seed data points from the plurality of data points of the sparse 3D point cloud, the plurality of the seed data points comprising the labeled pole-like data points and the labelled vertical-plane-like data points;

generating one or more region clusters based on the plurality of seed data points;

determining and storing a list of pole clusters or a list of vertical plane clusters from the one or more region clusters, the list of pole clusters comprising one or more of the labeled pole-like data points and the list of vertical plane clusters comprising one or more of the labelled vertical-plane-like data points; and generating the segmented point cloud based on the list of pole clusters or the list of vertical plane clusters.

2. The method of claim 1, wherein the sparse 3D point cloud is represented in a Cartesian coordinate system, and for any data point $P_i$ in the plurality of data points having a set of coordinate values $[x_i, y_i, z_i]$, the Azimuth angle of the data point $P_i$ is represented by $\alpha_i$ and computed by:

$$\alpha_i = \operatorname{atan}\left(\frac{y_i}{x_i}\right).$$

3. The method of claim 1, wherein the sparse 3D point cloud is represented in a spherical coordinate system of the LIDAR unit, each data point $P_i$ in the plurality of data points has a set of coordinate values $[r_i, \omega_i, \alpha_i]$, wherein:

$r_i$ represents a radial distance between an origin of the spherical coordinate system and the data point $P_i$;

$\omega_i$ represents an elevation angle of the data point $P_i$;

$\alpha_i$ represents the Azimuth angle of the data point $P_i$; and $P_i$ has a corresponding set of Cartesian coordinate values $[x_i, y_i, z_i]$ determined based on:

$x_i = r_i \cos \omega_i \cos \alpha_i$, $y_i = r_i \cos \omega_i \sin \alpha_i$, and $z_i = r_i \sin \omega_i$.

4. The method of claim 1, wherein determining the plurality of seed data points comprises:

for any two adjacent data points $P_i$ and $P_{i+1}$ in the sparse 3D point cloud as measured by any two adjacent laser beams of the multi-laser spinning LIDAR sensor, wherein $P_i$ and $P_{i+1}$ each occupies a respective element in two adjacent elements in a column of the range map, and wherein $P_i$ has a set of coordinate values $[x_i, y_i, z_i]$ and $P_{i+1}$ has a set of coordinate values $[x_{i+1}, y_{i+1}, z_{i+1}]$ in a Cartesian coordinate system of the multi-laser spinning LIDAR sensor:

computing an inclination value represented by $\vartheta$ between the two adjacent data points in accordance with the formula $$\vartheta = \operatorname{atan}\left(\frac{z_{i+1} - z_i}{\sqrt{x_{i+1}^2 + y_{i+1}^2} - \sqrt{x_i^2 + y_i^2}}\right);$$

and when the value of $\vartheta$ is within a pre-defined inclination threshold, the two adjacent data points $P_i$ and $P_{i+1}$ are determined to be seed data points.

5. The method of claim 4, wherein generating one or more region clusters comprises, for each seed data point, represented by $P_s$ and having a set of Cartesian coordinate values $[x_s, y_s, z_s]$ from the plurality of seed data points, when $P_s$ is not yet in any region cluster:

adding the seed data point $P_s$ as a new region cluster point $P_c$ into a new region cluster $Cl_i$, wherein $P_c$ has a set of Cartesian coordinate values $[x_c, y_c, z_c]$ equal to $[x_s, y_s, z_s]$.

6. The method of 5, wherein for each new region cluster data point $P_c$ in the region cluster $Cl_i$:

computing a horizontal distance $d_c$ of the new region cluster data point $P_c$ from an origin $[0, 0, 0]$ of the Cartesian coordinate system of the multi-laser spinning LIDAR sensor based on the formula $d_c = \sqrt{x_c^2 + y_c^2}$; and for each neighboring data point $p_n$ of the region cluster data point $P_c$ in the region cluster $Cl_i$, wherein $p_n$ has a set of Cartesian coordinate values $[x_n, y_n, z_n]$:

determining if the neighboring data point $p_n$ is a ground data point or a ceiling data point;

when the neighboring data point $p_n$ is neither a ground data point nor a ceiling data point, computing a horizontal distance $d_n$ of the neighboring point $P_n$ from the origin $[0, 0, 0]$ of the Cartesian coordinate system of the multi-laser spinning LIDAR sensor based on the formula $d_n = \sqrt{x_n^2 + y_n^2}$; and when a difference between $d_n$ and $d_c$ as determined by $\|d_n - d_c\|$ is less than a pre-defined distance threshold, adding the neighboring data point $p_n$ as a new region cluster data point into the region cluster $Cl_i$.

7. The method of claim 6, further comprising, after adding the neighboring data point $p_n$ into the region cluster $Cl_i$:

processing the neighboring data point $p_n$ as a new region cluster data point $P_c$ of the region cluster $Cl_i$.

8. The method of claim 5, wherein the neighboring data point $p_n$ of a region cluster data point $P_c$ in the region cluster $Cl_i$ is defined as a data point $p_n$ occupying an element of the range map that is immediately surrounding an element occupied by the region cluster data point $P_c$ on the range map.

9. The method of claim 5, wherein determining if the neighboring data point $p_n$ is a ground data point comprises:

for $p_n$ and an adjacent data point $p_{n+1}$ measured by two adjacent laser beams of the multi-laser spinning LIDAR sensor, wherein $p_n$ and $p_{n+1}$ each occupies a respective element in two elements in a column of elements in the range map, and wherein $p_{n+1}$ has a set of Cartesian coordinate values $[x_{n+1}, y_{n+1}, z_{n+1}]$:

computing an inclination value represented by $\vartheta_n$ between $p_n$ and $p_{n+1}$ in accordance with the formula $$\vartheta_n = \operatorname{atan}\left(\frac{z_{n+1} - z_n}{\sqrt{x_{n+1}^2 + y_{n+1}^2} - \sqrt{x_n^2 + y_n^2}}\right);$$

and when the value of $\vartheta_n$ is close to 0 degrees, determining $P_n$ to be a ground data point.

10. The method of claim 5, wherein determining if the neighboring data point $P_n$ is a ceiling data point comprises:

for $p_n$ and an adjacent data point $p_{n+1}$ measured by adjacent laser beams of the multi-laser spinning LIDAR sensor, wherein $p_n$ and $p_{n+1}$ each occupies a respective element in two elements in a column of elements in the range map, and wherein $p_{n+1}$ has a set of Cartesian coordinate values $[x_{n+1},y_{n+1},z_{n+1}]$:

computing an inclination value represented by $\vartheta_n$ between $p_n$ and $p_{n+1}$ in accordance with the formula $$\vartheta_n = \operatorname{atan}\left(\frac{z_{n+1}-z_n}{\sqrt{x_{n+1}^2+y_{n+1}^2}-\sqrt{x_n^2+y_n^2}}\right);$$

and when the value of $\vartheta_n$ is close to 180 degrees, determining $p_n$ to be a ceiling data point.

11. The method of claim 7, wherein determining and storing the list of pole clusters or the list of vertical plane clusters comprises:

removing all region clusters with a total number of data points that is less than a pre-defined cluster threshold from the one or more region clusters; and for each respective region cluster in the one or more region clusters:

generating a 3D bounding box for the respective region cluster, the 3D bounding box having a length of dx, a width of dy and a height of dz; and when dz is less than a pre-defined height threshold and $\sqrt{dx^2+dy^2}$ is less than a pre-defined diagonal threshold, removing the respective region cluster from the one or more region clusters.

12. The method of claim 11, wherein determining and storing the list of pole clusters comprises:

for each respective region cluster in the one or more region clusters:

when dx<1.0 m, dy<1.0 m and a slenderness ratio s, represented by $$s = \frac{dz}{\sqrt{dx^2+dy^2}},$$

is larger than a pre-defined slenderness threshold, determining and storing the respective region cluster as a pole cluster.

13. The method of claim 12, wherein determining and storing the list of vertical plane clusters comprises:

removing the pole clusters from the one or more region clusters; and for each of the remaining region clusters in the one or more region clusters:

computing an average cluster curvature value for the respective region cluster based on a respective curvature value of each data point in the respective region cluster; and when the average cluster curvature value for the respective region cluster is less than a pre-defined cluster curvature threshold, determining and storing the respective region cluster as a plane cluster.

14. A vehicle control system of an autonomous vehicle for processing a sparse 3D point cloud to a segmented point cloud in real time, the vehicle control system comprising:

a processor; and a memory coupled to the processor, the memory storing machine-executable instructions that, when executed by the processor, cause the vehicle control system to:

receive a sparse 3D point cloud captured by a multi-laser spinning light detection and ranging (LIDAR) sensor mounted to a vehicle, the sparse 3D point cloud comprising a plurality of data points, each of the plurality of data points in the sparse 3D point cloud having a set of coordinates in a coordinate system of the multi-laser spinning LIDAR sensor and being associated with a beam number from a plurality of beam numbers of the multi-laser spinning LIDAR sensor, each respective beam number from the plurality of beam numbers corresponding to a respective laser head of the multi-laser spinning LIDAR sensor;

generate, from the sparse 3D point cloud, a range map comprising a plurality of elements, each element of the range map corresponding to a value representing an Azimuth angle along an x-axis of the range map and a value representing an integer number along a y-axis of the range map, the x-axis having values ranging from −180 degrees to +180 degrees, the y-axis having integer numbers ranging from 0 to N−1, wherein N represents a total number of laser heads of the multi-laser spinning LIDAR sensor of the vehicle, and each integer number along the y-axis corresponds to a respective beam number from the plurality of beam numbers, each of the plurality of data points of the sparse 3D point cloud occupying a respective element of the plurality of elements;

for each beam number from the plurality of beam numbers, determine the Azimuth angle for each data point in the plurality of data points that is associated with the beam number;

for each data point from the plurality of data points associated with the beam number, mark a respective element of the range map as occupied by the respective data point based on the Azimuth angle and the associated beam number of the respective data point;

compute and store a curvature value for each of the plurality of data points of the sparse 3D point cloud, wherein for any data point $P_i$ occupying a respective element of the range map and having a set of coordinate values $[x_i,y_i,z_i]$, the curvature value of the data point $P_i$ is represented by c and computed by:

$$c = \sqrt{\frac{\left(2kx_i - \sum_{j=i-k,j\neq i}^{i+k} x_j\right)^2 + \left(2ky_i - \sum_{j=i-k,j\neq i}^{i+k} y_j\right)^2 + \left(2kz_i - \sum_{j=i-k,j\neq i}^{i+k} z_j\right)^2}{x_i^2 + y_i^2 + z_i^2}},$$

where values $[x_j,y_j,z_j]$, represents a set of Cartesian coordinate values of each adjacent data point $P_j$ in a plurality of adjacent data points in the sparse 3D point cloud, wherein the plurality of adjacent data points are generated by one or more laser beams emitted by the same laser head of the multi-laser spinning LIDAR sensor that has emitted the laser beam that generated $P_i$, and k is a total number of adjacent data points $P_j$, j={1, 2 . . . k} on each side of data point $P_i$ in a row of elements in the range map, and where k has a value ranging from 2 to 5;

label the data point in each respective element of the range map as one of a pole-like data point or a vertical-plane-like data point;

determine a plurality of seed data points from the plurality of data points of the sparse 3D point cloud, the plurality of the seed data points comprising the labeled pole-like data points and the labelled vertical-plane-like data points;

generate one or more region clusters based on the plurality of seed data points;

determine and storing a list of pole clusters or a list of vertical plane clusters from the one or more region clusters, the list of pole clusters comprising one or more of the labeled pole-like data points and the list of vertical plane clusters comprising one or more of the labelled vertical-plane-like data points; and generate the segmented point cloud based on the list of pole clusters or the list of vertical plane clusters.

15. A non-transitory computer-readable medium storing machine-executable instructions which, when executed by a processor of a vehicle control system of an autonomous vehicle causes the vehicle control system to:

receive a sparse 3D point cloud captured by a multi-laser spinning light detection and ranging (LIDAR) sensor mounted to a vehicle, the sparse 3D point cloud comprising a plurality of data points, each of the plurality of data points in the sparse 3D point cloud having a set of coordinates in a coordinate system of the multi-laser spinning LIDAR sensor and being associated with a beam number from a plurality of beam numbers of the multi-laser spinning LIDAR sensor, each respective beam number from the plurality of beam numbers corresponding to a respective laser head of the multi-laser spinning LIDAR sensor;

generate, from the sparse 3D point cloud, a range map comprising a plurality of elements, each element of the range map corresponding to a value representing an Azimuth angle along an x-axis of the range map and a value representing an integer number along a y-axis of the range map, the x-axis having values ranging from −180 degrees to +180 degrees, the y-axis having integer numbers ranging from 0 to N−1, wherein N represents a total number of laser heads of the multi-laser spinning LIDAR sensor of the vehicle, and each integer number along the y-axis corresponds to a respective beam number from the plurality of beam numbers, each of the plurality of data points of the sparse 3D point cloud occupying a respective element of the plurality of elements;

for each beam number from the plurality of beam numbers, determine the Azimuth angle for each data point in the plurality of data points that is associated with the beam number;

for each data point from the plurality of data points associated with the beam number, mark a respective element of the range map as occupied by the respective data point based on the Azimuth angle and the associated beam number of the respective data point;

compute and store a curvature value for each of the plurality of data points of the sparse 3D point cloud, wherein for any data point $P_i$ occupying a respective element of the range map and having a set of coordinate values $[x_i, y_i, z_i]$, the curvature value of the data point $P_i$ is represented by c and computed by:

$$c = \sqrt{\frac{\left(2kx_i - \sum_{j=i-k, j\neq i}^{i+k} x_j\right)^2 + \left(2ky_i - \sum_{j=i-k, j\neq i}^{i+k} y_j\right)^2 + \left(2kz_i - \sum_{j=i-k, j\neq i}^{i+k} z_j\right)^2}{x_i^2 + y_i^2 + z_i^2}},$$

where values $[x_j, y_j, z_j]$, represents a set of Cartesian coordinate values of each adjacent data point $P_j$ in a plurality of adjacent data points in the sparse 3D point cloud, wherein the plurality of adjacent data points are generated by one or more laser beams emitted by the same laser head of the multi-laser spinning LIDAR sensor that has emitted the laser beam that generated $P_i$, and k is a total number of adjacent data points $P_j$, j={1, 2 . . . k} on each side of data point $P_i$ in a row of elements in the range map, and where k has a value ranging from 2 to 5;

label the data point in each respective element of the range map as one of a pole-like data point or a vertical-plane-like data point;

determine a plurality of seed data points from the plurality of data points of the sparse 3D point cloud, the plurality of the seed data points comprising the labeled pole-like data points and the labelled vertical-plane-like data points;

generate one or more region clusters based on the plurality of seed data points;

determine and storing a list of pole clusters or a list of vertical plane clusters from the one or more region clusters, the list of pole clusters comprising one or more of the labeled pole-like data points and the list of vertical plane clusters comprising one or more of the labelled vertical-plane-like data points; and generate the segmented point cloud based on the list of pole clusters or the list of vertical plane clusters.

* * * * *